(12) United States Patent
Garegrat et al.

(10) Patent No.: US 11,687,341 B2
(45) Date of Patent: Jun. 27, 2023

(54) MULTI-VARIATE STRIDED READ OPERATIONS FOR ACCESSING MATRIX OPERANDS

(71) Applicant: Intel Corporation, Santa Clara, CA (US)

(72) Inventors: Nitin N. Garegrat, San Jose, CA (US); Tony L. Werner, Los Altos, CA (US); Jeff DelChiaro, Scotts Valley, CA (US); Michael Rotzin, Santa Clara, CA (US); Robert T. Rhoades, San Jose, CA (US); Ujwal Basavaraj Sajjanar, San Jose, CA (US); Anne Q. Ye, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 25 days.

(21) Appl. No.: 16/556,223

(22) Filed: Aug. 29, 2019

(65) Prior Publication Data

US 2019/0391811 A1 Dec. 26, 2019

(51) Int. Cl.
*G06F 9/30* (2018.01)
*G06F 9/345* (2018.01)

(52) U.S. Cl.
CPC ........ *G06F 9/3455* (2013.01); *G06F 9/30032* (2013.01); *G06F 9/30036* (2013.01)

(58) Field of Classification Search
CPC ............. G06F 9/30032; G06F 9/30036; G06F 9/3455; G06F 17/16; G06F 17/153
See application file for complete search history.

(56) References Cited

U.S. PATENT DOCUMENTS

| | | | | |
|---|---|---|---|---|
| 9,886,377 | B2* | 2/2018 | Werner | G06F 12/023 |
| 2017/0060811 | A1* | 3/2017 | Yang | G06F 17/16 |
| 2017/0097884 | A1* | 4/2017 | Werner | G06F 12/023 |
| 2018/0189227 | A1* | 7/2018 | Korthikanti | G06F 9/30043 |
| 2018/0341484 | A1* | 11/2018 | Fowers | G06F 9/30036 |
| 2019/0392297 | A1* | 12/2019 | Lau | G06N 3/04 |

OTHER PUBLICATIONS

Dakkak, Abdul, et al.; "Accelerating Reduction and Scan Using Tensor Core Units," Cornell University Library, Nov. 24, 2018; 12 pages.
EPO; Extended European Search Report issued in EP Patent Application No. 20180668.4, dated Dec. 16, 2020; 10 pages.
EPO Communication Pursuant to Rule 94(3) EPC in EP Application Serial No. 20180668.4 dated May 24, 2022 (6 pages).
EPO; Office Action issued in EP Patent Application No. 20180668.4, dated Aug. 18, 2021; 8 pages.

\* cited by examiner

*Primary Examiner* — Corey S Faherty
(74) *Attorney, Agent, or Firm* — Alliance IP, LLC

(57) ABSTRACT

In one embodiment, a matrix processor comprises a memory to store a matrix operand and a strided read sequence, wherein: the matrix operand is stored out of order in the memory; and the strided read sequence comprises a sequence of read operations to read the matrix operand in a correct order from the memory. The matrix processor further comprises circuitry to: receive a first instruction to be executed by the matrix processor, wherein the first instruction is to instruct the matrix processor to perform a first operation on the matrix operand; read the matrix operand from the memory based on the strided read sequence; and execute the first instruction by performing the first operation on the matrix operand.

25 Claims, 22 Drawing Sheets

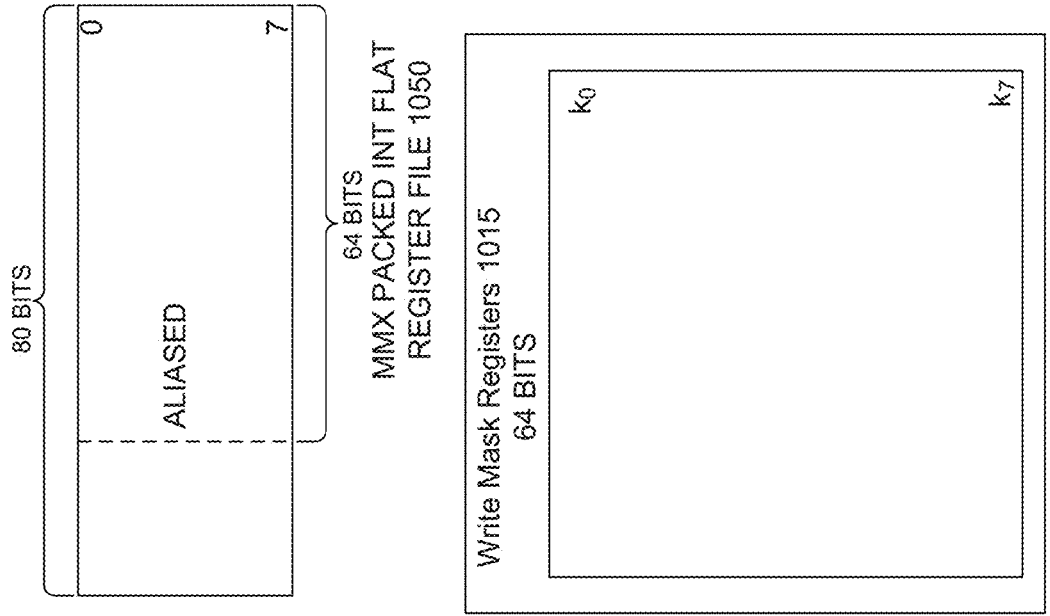
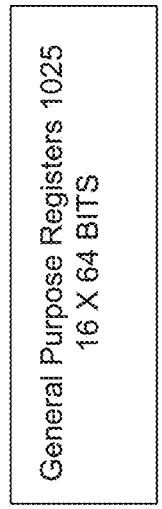
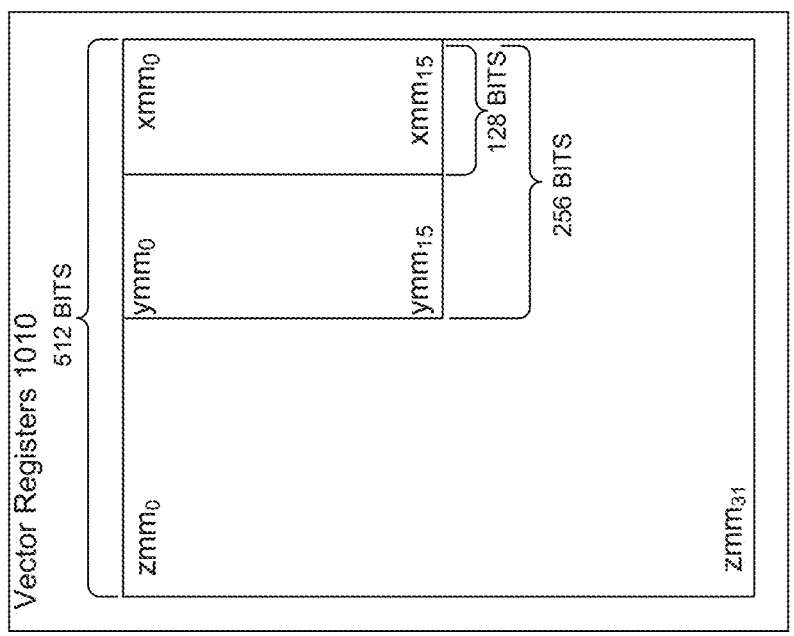
FIG. 10

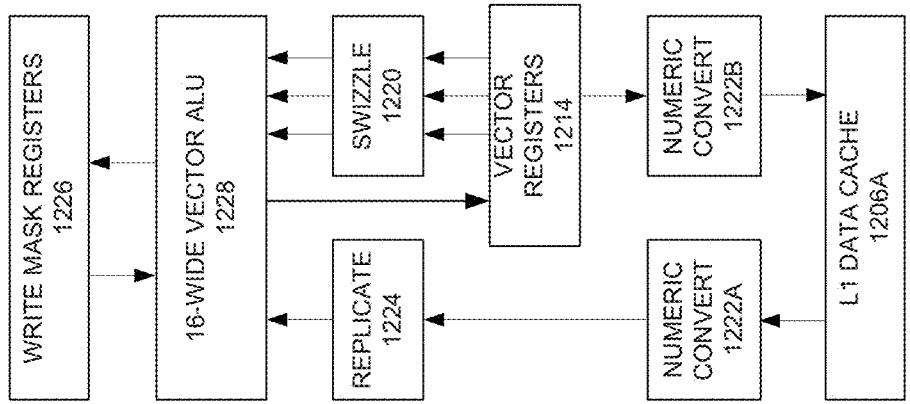
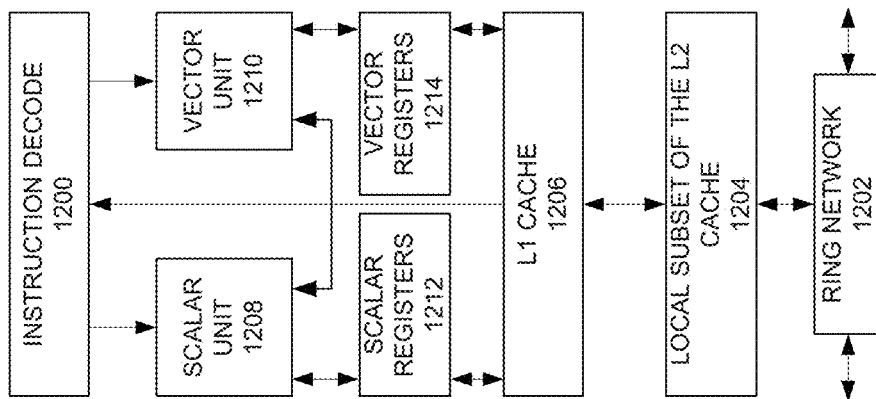

MULTI-VARIATE STRIDED READ OPERATIONS FOR ACCESSING MATRIX OPERANDS

FIELD OF THE SPECIFICATION

This disclosure relates in general to the field of matrix processing systems, and more particularly, though not exclusively, to multi-variate strided read operations for extracting matrix operands from memory.

BACKGROUND

Training an artificial neural network and/or performing inference using the neural network typically requires many compute-intensive operations that involve complex matrix arithmetic, such as matrix multiplication and convolution of numerous large, multi-dimensional matrix operands. The memory layout of these matrix operands is crucial to the overall performance of a neural network. In some cases, for example, a matrix operand stored in a particular format in memory may need to be extracted and/or converted into a different format in order to perform certain operations on the underlying matrix elements. For example, in order to perform certain neural network operations, the dimensions of a matrix operand may need to be shuffled or reordered, or certain portions of the matrix operand may need to be extracted, sliced, trimmed, and/or reordered. In many computing architectures, this requires the original matrix operand to be read from memory in its entirety, converted into the appropriate format or order, stored back in memory as a new matrix operand, and then operated on. This approach can be extremely inefficient, as it increases processing latency, memory access latency, and memory utilization.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 10 is a block diagram of a register architecture according to one embodiment of the disclosure.

FIGS. 12A-B illustrate a block diagram of a more specific exemplary in-order core architecture, which core would be one of several logic blocks (including other cores of the same type and/or different types) in a chip.

EMBODIMENTS OF THE DISCLOSURE

Figure 1:
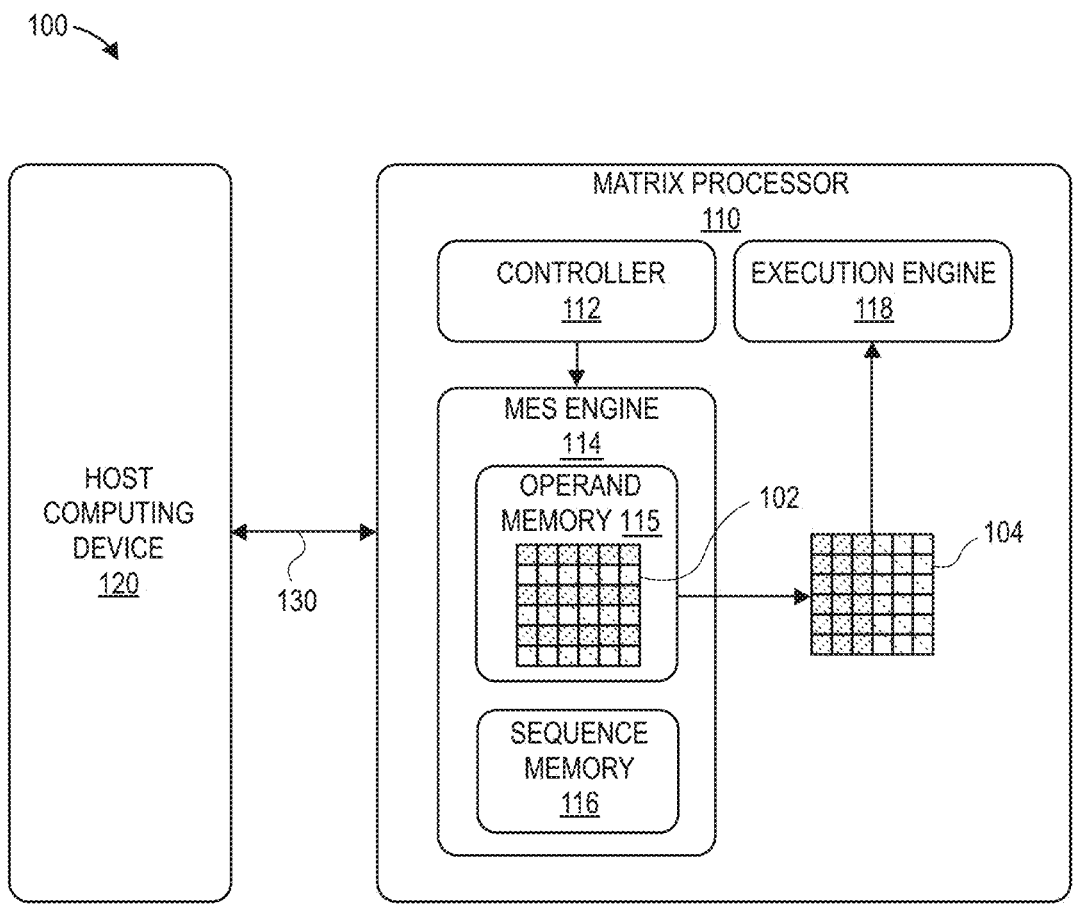
FIG. 1 illustrates an example embodiment of a matrix processing system that leverages multi-variate strided read operations to extract matrix operands from memory.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Multi-Variate Strided Read Operations for Extracting Matrix Operands

FIG. 1 illustrates an example embodiment of a matrix processing system 100 that leverages multi-variate strided read operations to extract matrix operands from memory. In some cases, for example, a matrix operand stored in a particular format in memory may need to be extracted and/or converted into a different format in order to perform a particular matrix operation. Accordingly, in the illustrated embodiment, a multi-variate strided read operation can be performed to extract the matrix operand directly from memory in the appropriate format or order required for the particular matrix operation, as described further below.

In the illustrated embodiment, matrix processing system 100 includes a matrix processor 110 communicatively coupled to a host computing device 120 via a communication interface or bus 130. In some embodiments, for example, the matrix processor 110 may be a hardware accelerator and/or neural network processor (NNP) designed to accelerate artificial intelligence (AI), machine learning (ML), and/or deep learning (DL) functionality on behalf of the host computing device 120, which may be a general-purpose computing platform that runs artificial intelligence applications (e.g., an Intel Xeon platform). For example, in some cases, the matrix processor 110 may be used to train an artificial neural network and/or perform inference on behalf of the host computing device 120, which typically requires many compute-intensive operations to be performed using complex matrix arithmetic, such as matrix multiplication and convolution of numerous large, multi-dimensional matrix operands.

The memory layout of these matrix operands, or tensors, is crucial to the overall performance of a neural network. In some cases, for example, a matrix operand stored in a particular format in memory may need to be extracted and/or converted into a different format in order to perform certain operations on the underlying matrix elements. For example, in order to perform certain neural network operations, the dimensions of a matrix operand may need to be shuffled or reordered, or certain portions of the matrix operand may need to be extracted, sliced, trimmed, and/or reordered.

In the illustrated embodiment, for example, a multi-dimensional matrix operand 102 may be transferred in a particular format from the host computing device 120 to the matrix processor 110 using direct memory access (DMA) (e.g., over a PCIe interface 130), but the matrix processor 110 may subsequently need to transform the matrix operand 102 into another format 104 in order to perform certain operations.

As an example, for a convolutional layer of a neural network, a matrix operand used to represent image data may be organized into dimensions with an order of CHW×N in the underlying memory layout, where:

C=channel depth (e.g., the number of channels in each input image);
H=height (e.g., the height of each input image);
W=width (e.g., the width of each input image); and
N=number of input images (e.g., the mini-batch size).

Based on the layer description and the math to be performed, however, the matrix processor 110 often needs to shuffle or reorder the dimensions of the matrix operand before operating on it. For example, if the matrix operand resides in memory in CHW×N format, the matrix processor 110 may need to perform a dimension shuffle to convert the operand into NHW×C format for a particular layer of the neural network.

As another example, a matrix operand used to represent a collection of convolution filters may be organized into dimensions with an order of CRS×K in the underlying memory layout, where:

C=channel depth;
R=filter height;
S=filter width; and
K=number of filters.

In some cases, the matrix processor 110 may need certain portions of the convolution filters stored in CRS×K format in memory to be extracted, sliced, trimmed, and/or reordered into another format.

In many computing architectures, performing an operation on a modified matrix operand requires the original matrix operand to be read from memory in its entirety, converted into the appropriate format or order, stored back in memory as a new matrix operand, and then operated on. This process can be extremely inefficient, as it increases processing latency, memory access latency, and memory utilization.

Accordingly, in the illustrated embodiment, the matrix processing system 100 is capable of operating on matrix operands in varying formats in a much more flexible and efficient manner. In particular, the matrix processor 110 can perform a multi-variate strided (MVS) read operation to extract a matrix operand 104 directly from memory in the appropriate format or order required for a particular matrix operation. In this manner, a matrix operand that is stored out of order 102 in memory can be extracted and/or converted into the correct format or order 104 using the MVS read operation.

In some embodiments, for example, the MVS operation may read the matrix operand from memory using a software-programmable strided read sequence. In particular, the strided read sequence may be programmed with a sequence of strided read operations, such as stride and band operations, that are designed to read the matrix operand from memory in the appropriate format or order.

For example, a stride operation may be used to read the memory at a specified stride or offset relative to a base memory address, such as +n strides from the previously read memory address:

stride+n=read memory[previous_address+n]

A band operation may be used to read the memory at a specified number of sequential memory addresses relative to a base memory address, such as n sequential memory addresses following the previously read memory address:

band+n=read memory[previous_address+1]
read memory[previous_address+2]
read memory[previous_address+ . . . ]
read memory[previous_address+n]

In this manner, a strided read sequence can be programmed with an appropriate sequence of stride and band operations in order to read a matrix operand from memory in the desired format or order. This software-programmable approach provides applications with substantial flexibility to extract matrix operands from memory in many different formats in a highly efficient manner.

In the illustrated embodiment, for example, the matrix processor 110 includes a controller 112, a matrix element storage and slicing (MES) engine 114, and an execution engine 118. The controller 112 receives instructions from the host computing device 120 and causes those instructions to be executed by the matrix processor 110.

The matrix element storage and slicing (MES) engine 114 handles storage and extraction of matrix operands that are used by the instructions. In particular, the MES engine 114 includes an operand memory 115 and a sequence memory 116. The operand memory 115 is used to store matrix data and operands, while the sequence memory 116 is used to store strided read sequences for extracting matrix operands from the operand memory 115. In some embodiments, for example, the operand memory 115 may include on-package DRAM (e.g., high-bandwidth memory (HBM)) and/or on-chip SRAM (e.g., a memory resource block (MRB) of a particular compute cluster), among other examples.

The execution engine 118 handles execution of the instructions. In some embodiments, for example, the execution engine 118 may include one or more matrix processing units (MPUs) designed to perform matrix arithmetic on matrix operands, such as matrix multiplication, convolution, element-wise arithmetic and logic (e.g., addition (+), subtraction (−), multiplication (*), division (/), bitwise logic (AND, OR, XOR, left/right shifts), comparison (>, <, >=, <=, ==, !=)), and column-wise, row-wise, and matrix-wide operations (e.g., sum, max value, min value), among other examples.

In some embodiments, in order for the matrix processor 110 to execute instructions that operate on a multi-variate (MV) matrix operand (e.g., a matrix operand that will be accessed using an MVS read operation), the following steps are performed as preconditions: (i) the MV operand is registered with the matrix processor 110; and (ii) the strided read sequence required to access the MV operand is programmed into the sequence memory 116. In some embodiments, for example, the matrix processor 110 may support certain instructions for performing these steps (e.g., which the host computing device 120 may issue to the matrix processor 110), such as a register multi-variate operand instruction (REGOP_MV) and a sequence memory write instruction (SEQMEM_WRITE).

For example, the register multi-variate operand instruction (REGOP_MV) may specify various parameters that collectively identify and/or define the MV operand, such as a handle identifier (ID), starting memory address (e.g., base memory address+offset in the operand memory 115), dimensions, numeric element type (e.g., BFLOAT16 or SP32), and various strided access parameters (e.g., address of the strided read sequence in sequence memory 116, read operation size, loop size, superstride), among other examples. Based on these parameters, the matrix processor 110 assigns the specified handle ID to the MV operand, which enables subsequent instructions to operate on the MV operand by referencing its assigned handle ID.

Further, the sequence memory write instruction (SEQMEM_WRITE) may be used to program the strided read sequence for the MV operand into the sequence memory 116.

Subsequent instructions that operate on the MV operand may then be executed by referencing the appropriate handle ID. In some embodiments, for example, upon receiving an instruction that references the handle ID assigned to the MV operand, the MV operand is retrieved from the operand memory 115 based on the previously registered parameters specified in the REGOP_MV instruction and the corresponding strided read sequence programmed into sequence memory 116, and the appropriate operation is then performed on the MV operand.

Additional functionality and embodiments relating to multi-variate strided read operations are described further in connection with the remaining FIGURES. Accordingly, it should be appreciated that matrix processing system 100 of FIG. 1 may be implemented with any aspects of the functionality and embodiments described throughout this disclosure.

Registration and Storage of Matrix Operands

In some embodiments, matrix processor 110 of FIG. 1 is designed to execute instructions that operate on two-dimensional (2D) matrix operands, which are each identified by a corresponding "handle." A handle serves as a pointer to a particular 2D matrix operand in memory. Moreover, matrix operands with more than two dimensions (e.g., three-dimensional (3D) and four-dimensional (4D) operands) may be supported by organizing the original dimensions into two subsets of dimensions that are each treated as a single dimension. For example, a 4D matrix operand with dimensions C×H×W×N (channels, height, width, number of images) may be organized into a 2D matrix operand as CHW×N, where dimensions C, H, and W are collectively treated as the first dimension and dimension N is treated as the second dimension.

Further, in some embodiments, matrix processor 110 may support multiple numerical formats for representing the underlying elements of the matrix operands, such as 16-bit brain floating-point format (BFLOAT16 or BF16) or 32-bit single-precision floating-point format (SP32), among other examples.

In some embodiments, the handles for these matrix operands are registered by software before any instructions to operate on the matrix operands are issued to the matrix processor 110. For example, software executing on the host computing device 120 may register a handle for a matrix operand by issuing a register operand instruction to the matrix processor 110.

Moreover, in some embodiments, the matrix processor 110 may support multiple variations of the register operand instruction depending on how a particular matrix operand is stored in memory. For example, a REGOP instruction may be used to register a normal matrix operand that is stored in order or sequentially in memory, while a REGOP_MV instruction may be used to register a multi-variate (MV) strided matrix operand that is stored out of order in memory.

For example, with respect to a normal matrix operand stored in order or sequentially in memory, the REGOP instruction may include various parameters that are used to register the matrix operand, such as a handle ID, dimensions (e.g., size of x and y dimensions), starting memory address, and numeric element type (e.g., BFLOAT16 or SP32):

REGOP handleID (sizex, sizey) addr ntype

The registered handle ID then serves as a pointer to the matrix operand in memory. For example, based on the parameters specified in the REGOP instruction, the handle identifier handleID is registered with the hardware to point to a matrix stored in memory at a particular starting memory address (addr), which has dimensions sizex by sizey, and contains sizex*sizey total elements of type ntype (e.g., BFLOAT16 or SP32).

Figure 2:
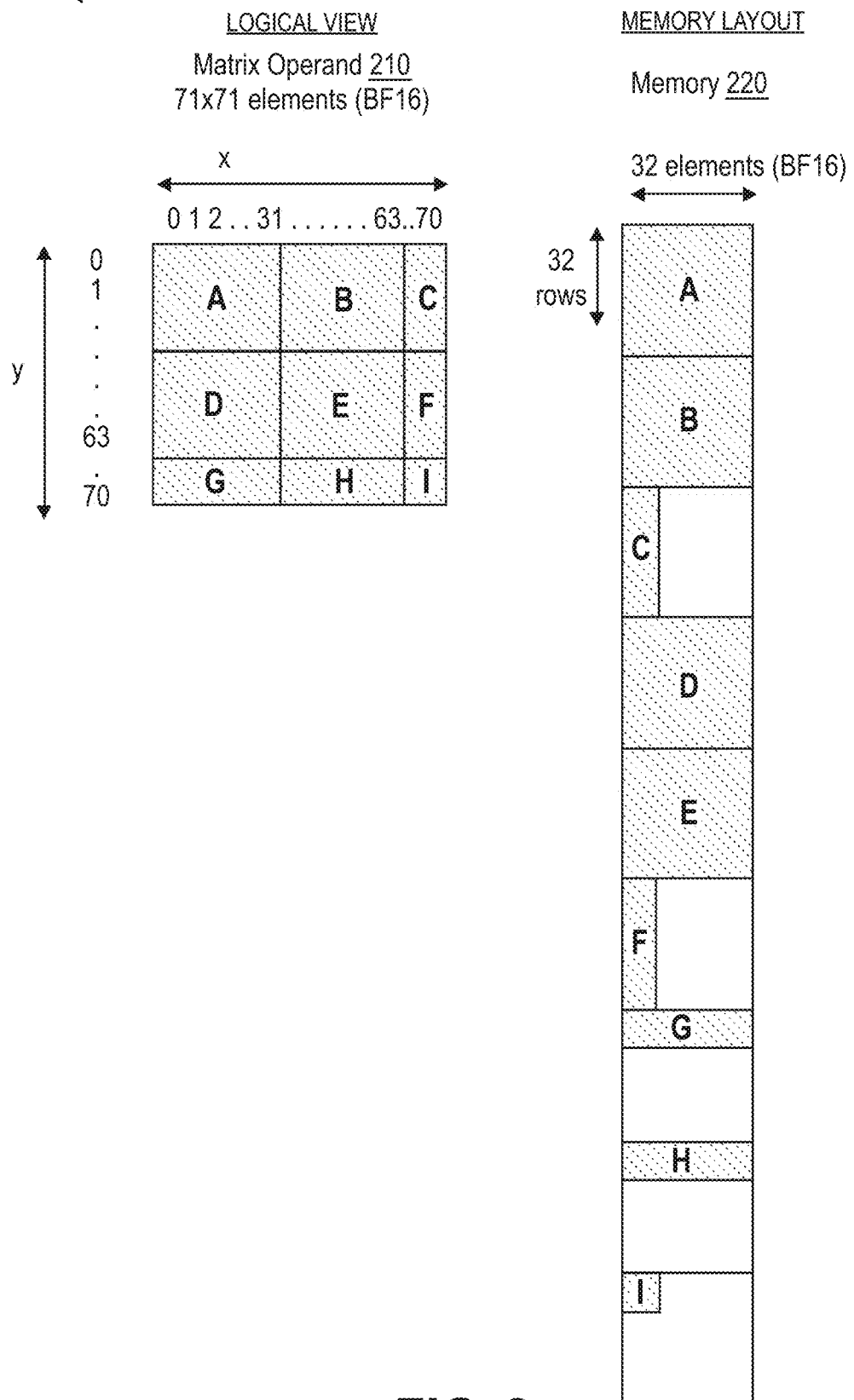
FIG. 2 illustrates an example of the memory layout for a matrix operand registered with dimensions of 71×71 and elements of type BFLOAT16.
Figure 3:
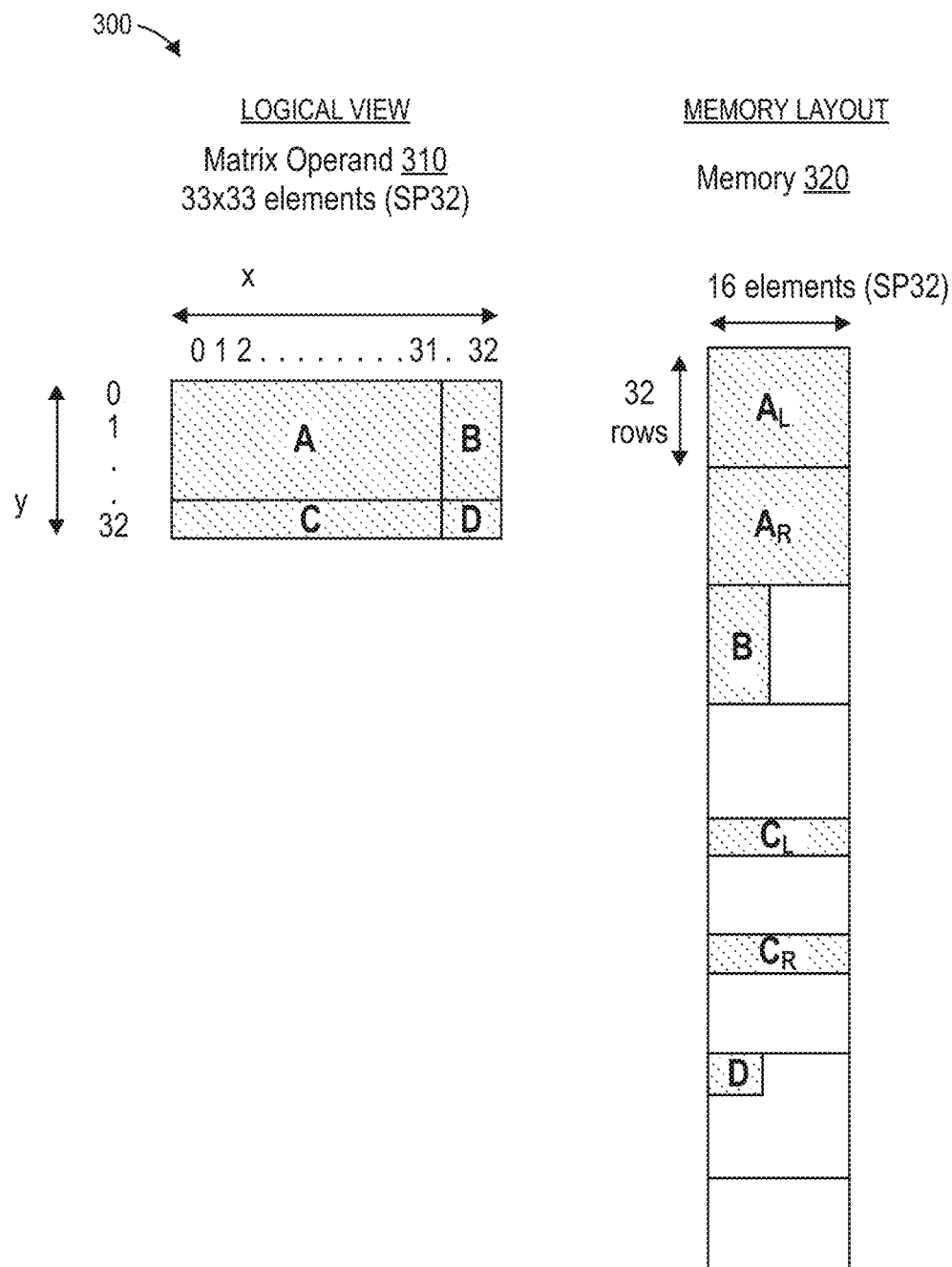
FIG. 3 illustrates an example of the memory layout for a matrix operand registered with dimensions of 33×33 and elements of type SP32.

FIGS. 2-3 illustrate examples of the memory layout of various matrix operands registered using REGOP instructions according to certain embodiments. In some embodiments, for example, the memory used to store a matrix operand may have a particular depth and width, such as a depth of 4,000 and a width of 512 bits (or 64 bytes). In this manner, the memory can store up to 4,000 rows of matrix elements, with each row containing up to 32 elements in BFLOAT16 format (512 b per row/16 b per element=32 elements per row) or 16 elements in SP32 format (512 b per row/32 b per element=16 elements per row). Moreover, in some embodiments, a matrix operand may be stored in chunks of memory of a particular size, such as 2 kilobyte (kB) chunks that each include 32 rows of the memory (e.g., 32 rows*512 bits per row=16,384 bits=2048 bytes≈2 kB).

FIG. 2 illustrates an example 200 of the memory layout for a matrix operand registered with dimensions of 71×71 and elements of type BFLOAT16. In some embodiments, for example, the matrix operand in example 200 may be registered using the REGOP instruction described above.

In the illustrated example, the logical view of the matrix operand 210 and the corresponding memory layout 220 are shown. In particular, the matrix operand 210 is logically arranged into 71 rows and 71 columns (71×71) of elements of type BFLOAT16. Moreover, for purposes of storing the matrix operand 210 in memory 220, the matrix operand 210 is partitioned into logical chunks (A-I) that each contain up to 32 rows and 32 columns of elements (32×32). Since the matrix operand 210 does not contain enough elements to completely fill the logical chunks on the right and bottom edges, those chunks are smaller than the maximum logical chunk size of 32×32. For example, while logical chunks A, B, D, and E each have a size of 32×32, logical chunks C, F, G, H, and I are smaller since they fall on the right and bottom edges of the matrix operand 210.

Moreover, the respective logical chunks (A-I) of the matrix operand 210 are stored sequentially in fixed-size chunks of memory 220. In the illustrated embodiment, for example, each memory chunk is 2 kB in size and includes 32 rows of memory 220 having a width of 512 bits (or 64 bytes), which means each row has the capacity to store up to 32 elements of type BFLOAT16. Thus, the size of a physical memory chunk is equivalent to the maximum size of a logical chunk (e.g., 32 rows of elements with 32 elements per row). Further, each logical chunk (A-I) is stored in a separate physical memory chunk regardless of whether the logical chunk completely fills an entire memory chunk. For example, while logical chunks A, B, D, and E each fill an entire 32×32 memory chunk, logical chunks C, F, G, H, and I are smaller in size and thus each of them only partially fills a 32×32 memory chunk.

FIG. 3 illustrates an example 300 of the memory layout for a matrix operand registered with dimensions of 33×33 and elements of type SP32. In some embodiments, for example, the matrix operand in example 300 may be registered using the REGOP instruction described above.

In the illustrated example, the logical view of the matrix operand 310 and the corresponding memory layout 320 are shown. In particular, the matrix operand 310 is logically arranged into 33 rows and 33 columns (33×33) of elements of type SP32. Moreover, for purposes of storing the matrix operand 310 in memory 320, the matrix operand 310 is partitioned into logical chunks (A-D) that each contain up to 32 rows and 32 columns of elements (32×32). Since the matrix operand 310 does not contain enough elements to completely fill the logical chunks on the right and bottom edges, those chunks are smaller than the maximum logical chunk size of 32×32. For example, while logical chunk A has the maximum size of 32×32, logical chunks B, C, and D are smaller since they fall on the right and bottom edges of the matrix operand 310.

Moreover, the respective logical chunks (A-D) of the matrix operand 310 are stored sequentially in fixed-size chunks of memory 320. In the illustrated embodiment, for example, each memory chunk is 2 kB in size and includes 32 rows of memory 320 having a width of 512 bits (or 64 bytes), which means each row has the capacity to store up to 16 elements of type SP32 (e.g., 32×16). Thus, the size of a physical memory chunk is half the maximum size of a logical chunk, as the size of a physical memory chunk is 32×16 while the maximum size of a logical chunk is 32×32. As a result, some logical chunks will be larger than a single physical memory chunk, which means they will have to be partitioned and stored across two physical memory chunks. Accordingly, each logical chunk (A-D) is stored in two physical memory chunks regardless of whether the logical chunk completely fills those memory chunks.

For example, logical chunk A has the maximum size of 32×32, which means it will completely fill two physical memory chunks. Thus, logical chunk A is partitioned into left and right logical chunks $A_L$ and $A_R$ of size 32×16, which are each stored in a separate physical memory chunk.

Logical chunk B has a size of 32×1, which means it can fit within a single physical memory chunk. Nonetheless, logical chunk B is still stored in memory 320 using two memory chunks, which means the first memory chunk is partially filled with logical chunk B while the second memory chunk is empty.

Logical chunk C has a size of 1×32, which means it is too wide to fit within a single physical memory chunk, as logical chunk C has a width of 32 elements while a physical memory chunk has a width of 16 elements. Thus, logical chunk C is partitioned into left and right logical chunks $C_L$ and $C_R$ of size 1×16, which are each stored in a separate physical memory chunk that is only partially filled.

Logical chunk D has a size of 1×1, which means it can fit within a single physical memory chunk. Nonetheless, logical chunk D is still stored in memory 320 using two memory chunks, which means the first memory chunk is partially filled with logical chunk D while the second memory chunk is empty.

Multi-Variate Strided Matrix Operands

As noted above, in some cases, a matrix operand stored in a particular format or order in memory may need to be extracted and/or converted into a different format or order to perform a particular matrix operation. Thus, in some embodiments, matrix processor 110 may support a "register multi-variate operand" instruction (REGOP_MV) to register a handle ID for a multi-variate (MV) operand that is stored out of order and/or non-contiguously in memory. In this manner, subsequent instructions can operate on the MV operand by simply referencing its assigned handle ID. For example, upon receiving a subsequent instruction that references the handle ID assigned to the MV operand, the matrix processor 110 automatically extracts the MV operand from memory in the appropriate format or order using a multi-variate strided (MVS) read operation, and the appropriate operation corresponding to the received instruction is then performed on the MV operand.

In some embodiments, for example, the REGOP_MV instruction used to register an MV operand may include the following fields and/or parameters:

REGOP_MV handleID (sizex, sizey, rd_offset, operation_size, seqmem_offset, superstride, loop_size) base_addr ntype Once the REGOP_MV instruction has been executed, the registered handle ID serves as a pointer to the MV matrix operand in memory and further indicates that the operand should be read from memory in a strided fashion (e.g., based on the specified parameters in the REGOP_MV instruction and a corresponding software-programmable strided read sequence).

For example, based on the parameters specified in the REGOP_MV instruction, the handle identifier 'handleID' is registered with the hardware and points to a matrix stored in memory beginning at a particular starting memory address (base_addr+rd_offset), which has dimensions 'sizex' by 'sizey', and contains elements of type 'ntype' (e.g., BFLOAT16 or SP32). The registered 'handleID' also indicates that the matrix is a multi-variate (MV) operand that should be accessed using an MVS read operation, as the matrix may be stored out of order and/or non-contiguously in memory.

The particular MVS read operation used to access the MV operand involves a specified number of underlying read operations (operation_size), which are performed by looping through a strided read sequence of a particular size (loop_size), performing the strided and/or banded read operations in the strided read sequence, and applying a 'superstride' between each iteration of the strided read sequence (e.g., until the specified number of underlying read operations (operation_size) has been performed). Moreover, the particular strided read sequence used in the MVS read operation is retrieved from a sequence memory at a specified offset (seqmem_offset), which is programmed into the sequence memory beforehand by software (e.g., using a SEQMEM_WRITE instruction).

In this manner, the REGOP_MV instruction enables software to inform the hardware that certain matrix operands should be extracted from memory in a strided fashion via specific strided read sequences dictated by the software (e.g., thus allowing the software to choose which rows and/or columns to read out of the logical tensor stored in memory, in what order, and so forth).

In some embodiments, for example, a sequence memory is used to store strided read sequences that can be used to extract MV operands from memory. For example, a particular strided read sequence in the sequence memory may include a sequence of stride and/or band instructions. A stride instruction is used to perform a single read operation at a particular stride offset n, while a band instruction is used to perform n sequential read operations.

In some embodiments, the sequence memory has a depth of 256 entries (e.g., memory addresses) and width of 9 bits (256 entries x 9b). Moreover, each entry or address of the sequence memory is capable of storing a single instruction for a particular strided read sequence, such as a stride instruction or a band instruction. For example, the most significant bit (MSB) of an entry in the sequence memory may indicate whether the particular instruction is a stride or band instruction, while the remaining bits may indicate a value for the particular stride or band instruction (e.g., an offset n for a stride operation, or a number of sequential reads n for a band operation).

A more detailed description of the fields of the REGOP_MV instruction is provided below in TABLE 1 and the sections that follow.

TABLE 1

Fields of the 'register multi-variate operand' (REGOP_MV) instruction

| FIELD | DESCRIPTION |
|---|---|
| opcode | An opcode value corresponding to the register multi-variate operand (REGOP_MV) instruction. |
| handleID [6:0] | A handle identifier to be registered for a multi-variate (MV) matrix operand (e.g., a matrix operand that will be accessed using an MVS read operation). |
| sizex [15:0] | The size of the x dimension of the MV operand (e.g., # of columns). The unit is the numeric element type defined by the 'ntype' field, such as BFLOAT16 (2 bytes) or SP32 (4 bytes). |
| sizey [15:0] | The size of the y dimension of the MV operand (e.g., # of rows). The unit is the numeric element type defined by the 'ntype' field, such as BFLOAT16 (2 bytes) or SP32 (4 bytes). |
| ntype [1:0] | The numeric type of the elements in the MV matrix operand, such as BFLOAT16 (2 bytes) or SP32 (4 bytes).<br>For example:<br>ntype = 'b00 → BFLOAT16<br>ntype = 'b01 → SP32<br>ntype = 'b11, 'b10 → Reserved for other numeric element types |
| base_addr [15:0] | The base memory address of the MV operand. |
| rd_offset [11:0] | The offset applied to the base memory address (base_addr) for the $1^{st}$ read to be performed by the MVS read operation. |
| operation_size [15:0] | The total number of underlying read operations that must be performed by an MVS read operation to read the MV operand from memory.<br>For example, each underlying read operation performed by the MVS read operation may read a particular memory address, which may correspond to a logical line or row of memory. Thus, the 'operation_size' field dictates the total number of memory addresses, or logical lines of memory, that will be read by the MVS read operation.<br>In some embodiments, for example, the 'operation_size' field is used to determine the number of 32x* block reads that need to be performed to read the entire MV operand from memory. For example, if the 'ntype' of the MV operand is BFLOAT16, then 'operation_size' may be used as is since each row of memory has the capacity to store 32 elements of type BFLOAT16. However, if the 'ntype' of the MV operand is SP32, then 'operation_size' may be doubled (operation_size*2) since each row of memory can only store 16 elements of type SP32. |
| seqmem_offset [7:0] | The starting offset within a sequence memory, which contains a software-programmable strided read sequence used to access the MV operand.<br>For example, the strided read sequence is programmed into the sequence memory at 'seqmem_offset' ahead of time by software (e.g., using the SEQMEM_WRITE instruction).<br>When an instruction is received that references the 'handleID' of the MV operand, an MVS read operation is performed, which loops through the strided read sequence to read the MV operand from memory in the appropriate format or order. |
| superstride [15:0] | The superstride offset applied to the starting memory address after each iteration of the strided read sequence (e.g., the superstride is applied after 'loop_size' number of entries/instructions in the sequence memory are read and performed during each iteration of the strided read sequence). |
| loop size [7:0] | The number of entries/instructions in the sequence memory to be read/performed during each iteration of the strided read sequence (e.g., before applying the superstride).<br>For example, the strided read sequence in the sequence memory is continuously read/looped from the starting seqmem location (seq mem[seqmem_offset]) to the final seq mem location (seqmem[seqmem_offset + loop_size-1]), and the superstride is applied after each iteration of the loop, until the entire MVS read operation is complete (e.g., the total number of read operations performed = 'operation_size'). |

In some embodiments, for example, when an instruction is received that references the registered 'handleID' of a multi-variate (MV) matrix operand (e.g., an operand registered via the REGOP_MV instruction), the MV operand is automatically extracted from memory in the appropriate format or order using a multi-variate strided (MVS) read operation (e.g., based on the fields specified in the REGOP_MV instruction and the corresponding strided read sequence in sequence memory).

For example, the MVS read operation for the particular MV operand performs a first read of memory at the memory address indicated by the 'base_addr'+'rd_offset' fields of the REGOP_MV instruction. What happens next depends on the contents of the sequence memory. In particular, the strided read sequence for the particular MV operand is programmed into the sequence memory at the offset specified in the 'seqmem_offset' field of the REGOP_MV instruction, and the number of instructions in that strided read sequence is dictated by the 'loop_size' field.

Thus, the hardware will first read the sequence memory at the address given by the 'seqmem_offset.' If the MSB[b8]=1, this is a banded instruction and it indicates the number of additional reads that should be performed to sequential memory locations. If the MSB[b8]=0, this is a stride instruction and it indicates the offset that should be added to the current memory address to find the next desired memory location to be read.

The hardware will continue this process by reading the next sequence memory location and applying the same rules as before. If the previous sequence memory instruction was a stride instruction, the next sequence memory instruction is immediately applied. If the previous sequence memory instruction was a band instruction, however, the next sequence memory instruction is only applied once the specified number of banded read operations have completed. Thus, if a stride instruction is followed by a band instruction, a first read operation is performed at a memory address indicated by the stride offset, and then the specified number of banded read operations are performed at sequential memory addresses that immediately follow. For example, a stride+n instruction followed by a band+3 instruction will read from 4 sequential memory locations: one due to the strided jump to the memory address at offset +n, and then three more due to the banded reads at the memory addresses that immediately follow. However, any sequence of stride and/or band instructions is permitted. For example, there can be one or more consecutive stride instructions and/or one or more consecutive band instructions (although multiple back-to-back band instructions is inefficient, as they could have been easily combined into a single band instruction).

After each memory read operation performed for the MV operand (e.g., a read of a memory address containing elements of the MV operand), a counter associated with the 'operation_size' field of the REGOP_MV instruction is incremented by 1. Similarly, after each read of an instruction in sequence memory (e.g., a stride or band instruction), a counter associated with the 'loop_size' field of the REGOP_MV instruction is incremented by 1. This process continues until one of two events are detected: either the 'loop_size' or the 'operation_size' is reached.

If the 'loop_size' is reached, a superstride event has occurred. This means a superstride is added to the starting memory address (e.g., base_addr+rd_offset+superstride), and a read operation is then performed at the new starting memory address. After this read has completed, the engine will repeat the sequence memory loop once again. It starts by reading the first sequence memory instruction again (e.g., located at 'seqmem_offset' in the sequence memory) and applies it the same as before. It continues to read the same sequence memory instructions until either the 'loop_size' is reached a second time or the 'operation_size' is reached for the first time. If the 'loop_size' is reached before the 'operation_size,' the process repeats at a new starting memory address computed by applying another superstride (e.g., base_addr+rd_offset+2*superstride). Once 'operation_size' is reached, the MVS read operation is complete, and the MV operand has been read from memory.

Moreover, in some embodiments, there may be multiple variations or modes of an MVS read operation: direct and rotate. The method of calculating the memory addresses used to read the MV operand from memory is the same for both variations. The difference is whether a rotating memory select is applied to rows read from memory (e.g., based on a 'rd_width' field). For example, in direct mode, a row read from memory is treated as a row in the resulting MV operand. In rotate mode, however, a row read from memory is rotated or transposed into a column in the resulting MV operand.

As noted above, the contents of the sequence memory inform the hardware of the corresponding strided read sequence used to access a particular MV operand. The sequence memory can be programmed by software via a sequence memory write (SEQMEM_WRITE) instruction. A description of the fields of the SEQMEM_WRITE instruction is provided below in TABLE 2.

TABLE 2

Fields of the 'sequence memory write' (SEQMEM_WRITE) instruction

| FIELDS | DESCRIPTION |
| --- | --- |
| handleID [6:0] | The handle identifier of the MV operand associated with the particular strided read sequence that is being programmed into sequence memory. In some embodiments, for example, there may be multiple operand memories (e.g., MRBs, HBMs) and multiple sequence memories, and each operand memory may be associated with a separate sequence memory. Thus, the handle ID of the MV operand may be used to identify the particular sequence memory to be programmed by the SEQMEM_WRITE instruction (e.g., the sequence memory that corresponds to the particular operand memory used to store the MV operand). |
| wc [1:0] | Each instruction is assigned a wall-context. The completion status of instructions is tracked per wall-context and per client. |
| seqmem_offset [7:0] | The starting offset or index within the sequence memory where the strided read sequence (e.g., in the 'data' field) will be stored. |

TABLE 2-continued

Fields of the 'sequence memory write' (SEQMEM_WRITE) instruction

| FIELDS | DESCRIPTION |
| --- | --- |
| data [71:0] | The 'data' field contains the stride and/or band instructions to be programmed into sequence memory.<br>For example, using a 72-bit 'data' field and a sequence memory with 9-bit entries, each SEQMEM_WRITE instruction can program up to 8 stride and/or band instructions into sequence memory. |
| data_en [7:0] | This 8-bit field indicates which of the 8 words (9 bits per word) in the 'data' field are valid. Each valid word in the 'data' field contains a stride and/or band instruction that will be programmed into sequence memory.<br>For example, if software sets 'data_en' = 8'b1100 1111, then the words in the 'data' field at data[44:36] and data[53:45] are invalid, while the remaining words are valid. The valid words in the 'data' field will be written to sequence memory beginning at 'seqmem_offset,' and entries in sequence memory corresponding to the invalid words will be skipped. |

In some cases, this concept of multi-variate matrix operands may be used to perform dimension shuffle operations. For example, the following primitives are typically required to support every possible dimension shuffle operation on a multi-dimensional tensor:

Primitive 1: AB×C→BA×C
Primitive 2: AB×C→AC×B
Primitive 3: AB×C→C×AB

In the described embodiments, however, dimension shuffle operations (e.g., AB×C→BC×A) can be performed directly using MVS read operations. For example, a multi-variate matrix operand can be registered via the REGOP_MV instruction using various parameters and a strided read sequence that are designed to shuffle or reorder the dimensions of a matrix operand stored in memory.

Figure 4:
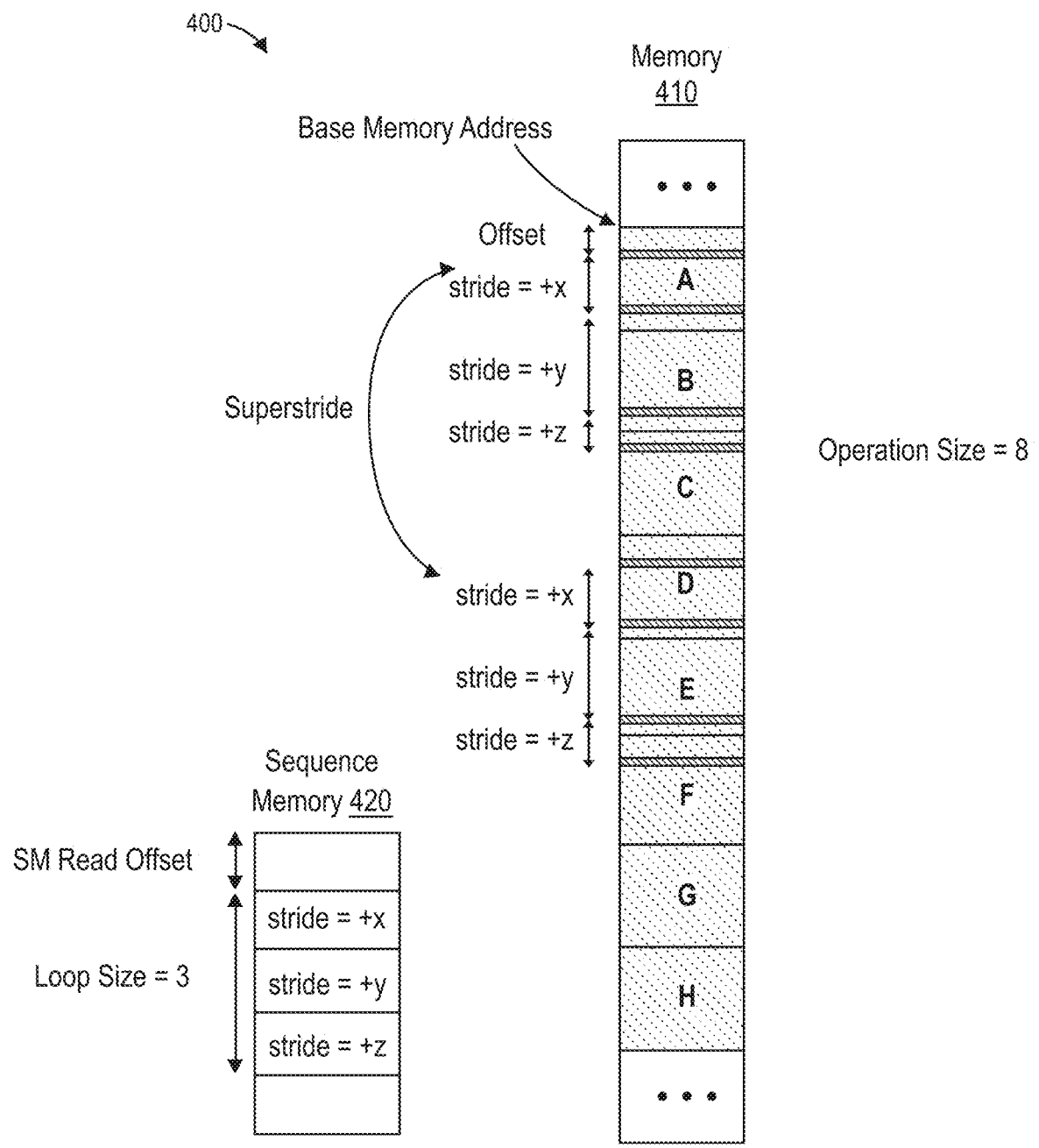
FIGS. 4, 5, and 6A-B illustrate examples of multi-variate strided read operations.

FIG. 4 illustrates an example of an MVS read operation 400. In particular, the illustrated example shows the layout of a matrix operand stored in memory 410, along with the instructions of a strided read sequence programmed into sequence memory 420 (which only contains stride instructions in this example).

Moreover, the illustrated example depicts how the MVS read operation 400 reads an MV operand from memory 410 based on (i) the various fields specified in the REGOP_MV instruction and (ii) the corresponding strided read sequence in sequence memory 420. In particular, the illustrated example depicts the rows of memory 410 that are read by the MVS read operation 400, which contain the elements of the MV operand.

For example, the following pseudocode illustrates how the MVS read operation 400 reads the MV operand from memory 410:

```
// Read 8 total lines of memory ('operation_size' = 8)
// Read first line of memory at starting memory address
(base addr + rd_offset)
  read memory[base_addr + rd_offset]
// Read strided read sequence from seqmem: 3 instructions ('loop_size')
beginning at 'seqmem_offset'
  read seqmem[seqmem_offset]            // stride +x instruction
  read seqmem[seqmem_offset + 1]        // stride +y instruction
  read seqmem[seqmem_offset + 2]        // stride +z instruction
// Perform strided read sequence relative to starting memory address
  read memory[base_addr + rd_offset + x]            // stride +x
  read memory[base_addr + rd_offset + x + y]        // stride +y
  read memory[base_addr + rd_offset + x + y + z]    // stride +z
// Apply 'superstride' to starting memory address
  read memory[base_addr + rd_offset + superstride]
```

```
// Repeat strided read sequence relative to new starting memory address
  read memory[base_addr +rd_offset + superstride + x]
  read memory[base_addr +rd_offset + superstride + x + z]
  read memory[base_addr +rd_offset + superstride + x +y + z]
```

Figure 5:
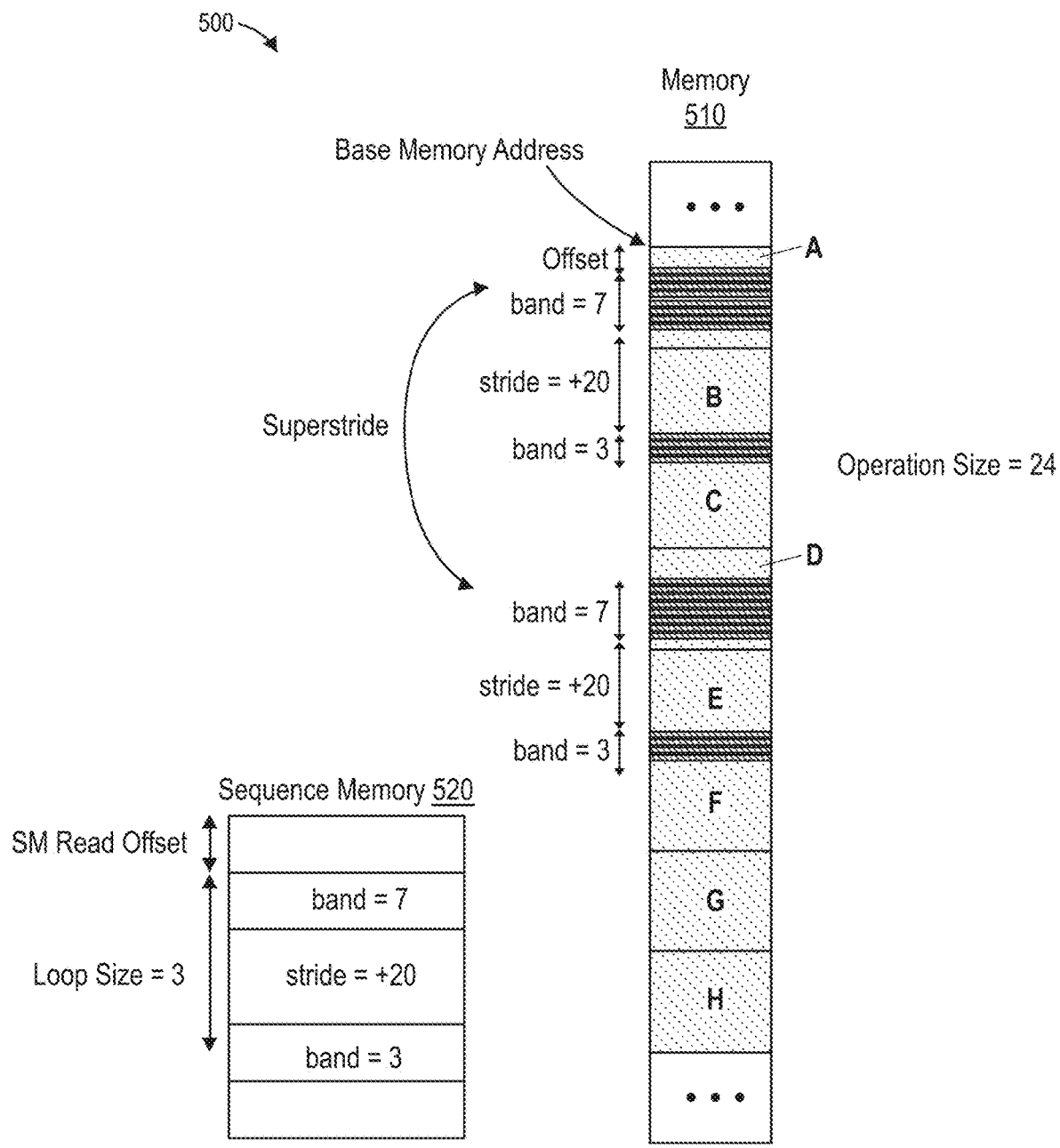

FIG. 5 illustrates another example of an MVS read operation 500. In the illustrated example, the strided read sequence programmed into sequence memory 520 includes both stride and band instructions.

The following pseudocode illustrates how the MVS read operation 500 reads the MV operand from memory 510:

```
// Read 24 total lines of memory ('operation_size' = 24)
// Read first line of memory at starting memory address
  read memory[base_addr + rd_offset]
// Read strided read sequence from seqmem: 3 instructions (loop_size)
beginning at 'seqmem_offset'
  read seqmem[seqmem_offset]            // band +7 instruction
  read seqmem[seqmem_offset + 1]        // stride +20 instruction
  read seqmem[seqmem_offset + 2]        // band +3 instruction
// Perform strided read sequence relative to starting memory address
  read memory[base_addr +rd_offset + 1] to memory
  [base_addr + rd_offset + 7]
  read memory[base_addr +rd_offset + 7 + 20]
  read memory[base_addr +rd_offset + 7 + 20 + 1]to memory[base_addr
+
rd_offset + 7 + 20 + 3]
// Apply 'superstride' to starting memory address
  read memory[base_addr + rd_offset + superstride]
// Repeat strided read sequence and superstride until 24 total lines of
memory have been read ('operation_size' = 24)
```

Figure 6A:
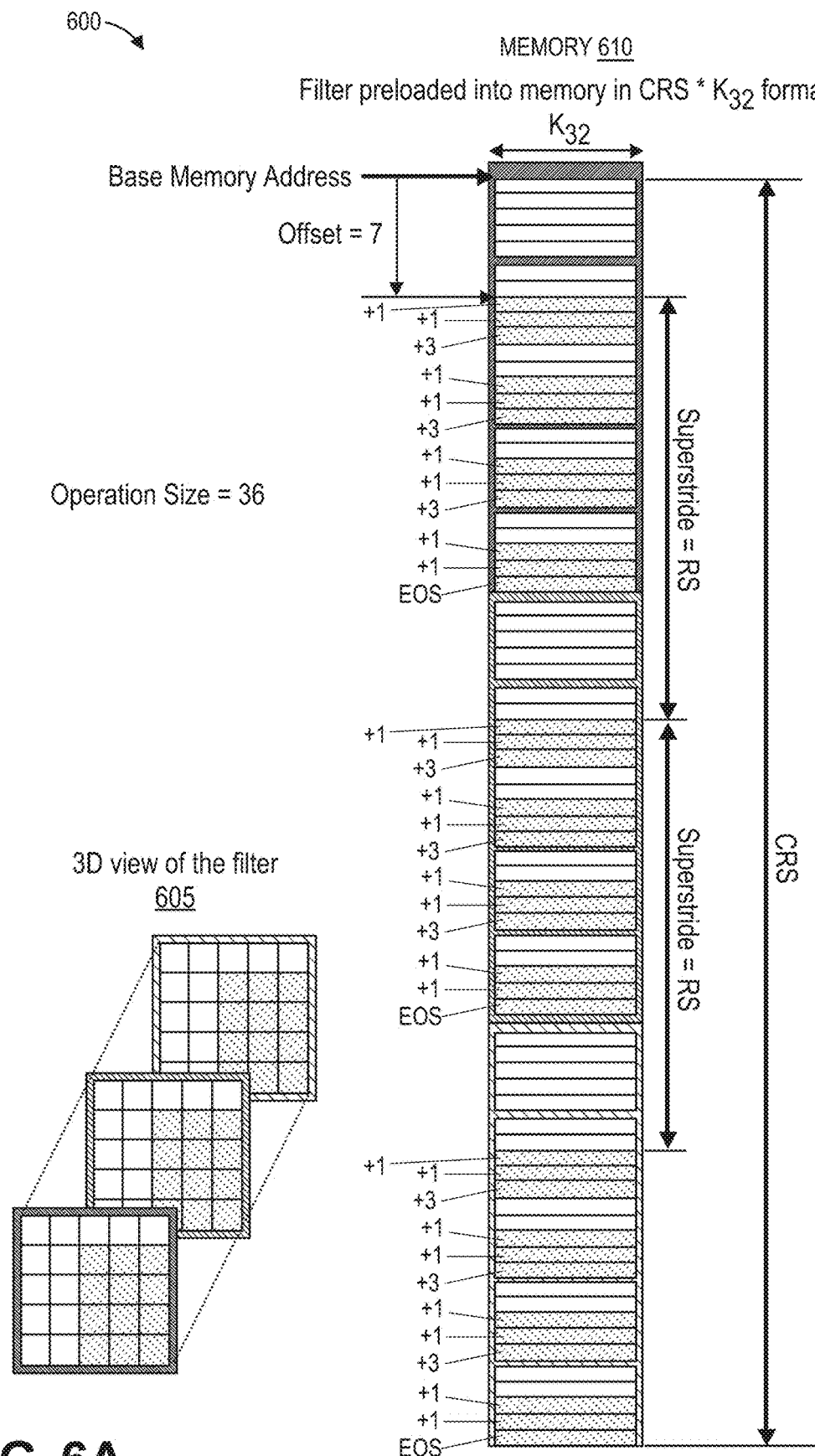
Figure 6B:
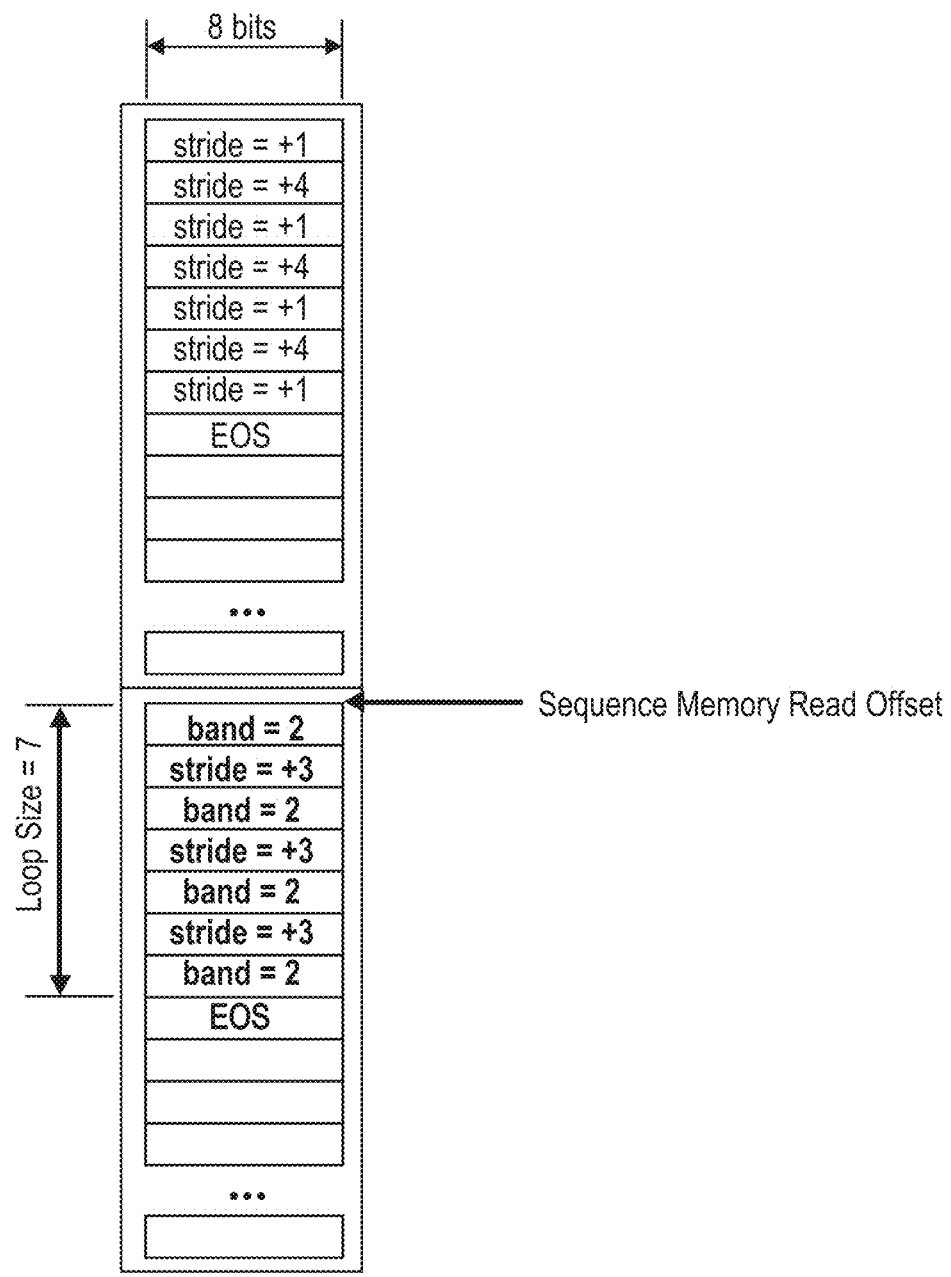

FIGS. 6A-B illustrate another example of an MVS read operation 600. In the illustrated example, the MVS read operation 600 is used to extract a portion of a 3D convolution filter 605 that is stored in memory 610 in CRS×K format. Thus, an MV operand is registered via the REGOP_MV instruction using the following parameters:

i. base memory address=shown in figure;
ii. memory offset=7;
iii. operation size=36 (e.g., total number of read operations=number of pixels in each row*number of rows (3*12=36));
iv. sequence memory offset=shown in figure;
v. loop size=7 (#number of sequence memory instructions, which determines the number of reads per filter); and
vi. superstride=R*S.

Based on these parameters, along with the strided access sequence programmed into sequence memory 620, the MVS read operation 600 will perform three iterations of read operations to read the MV operand from memory 610:

36 total reads (operation_size)/12 reads per iteration (1 initial read+11 reads for the strided access sequence)=3 iterations.

The number of iterations (3) corresponds to the number of channels (C).

Figure 7:
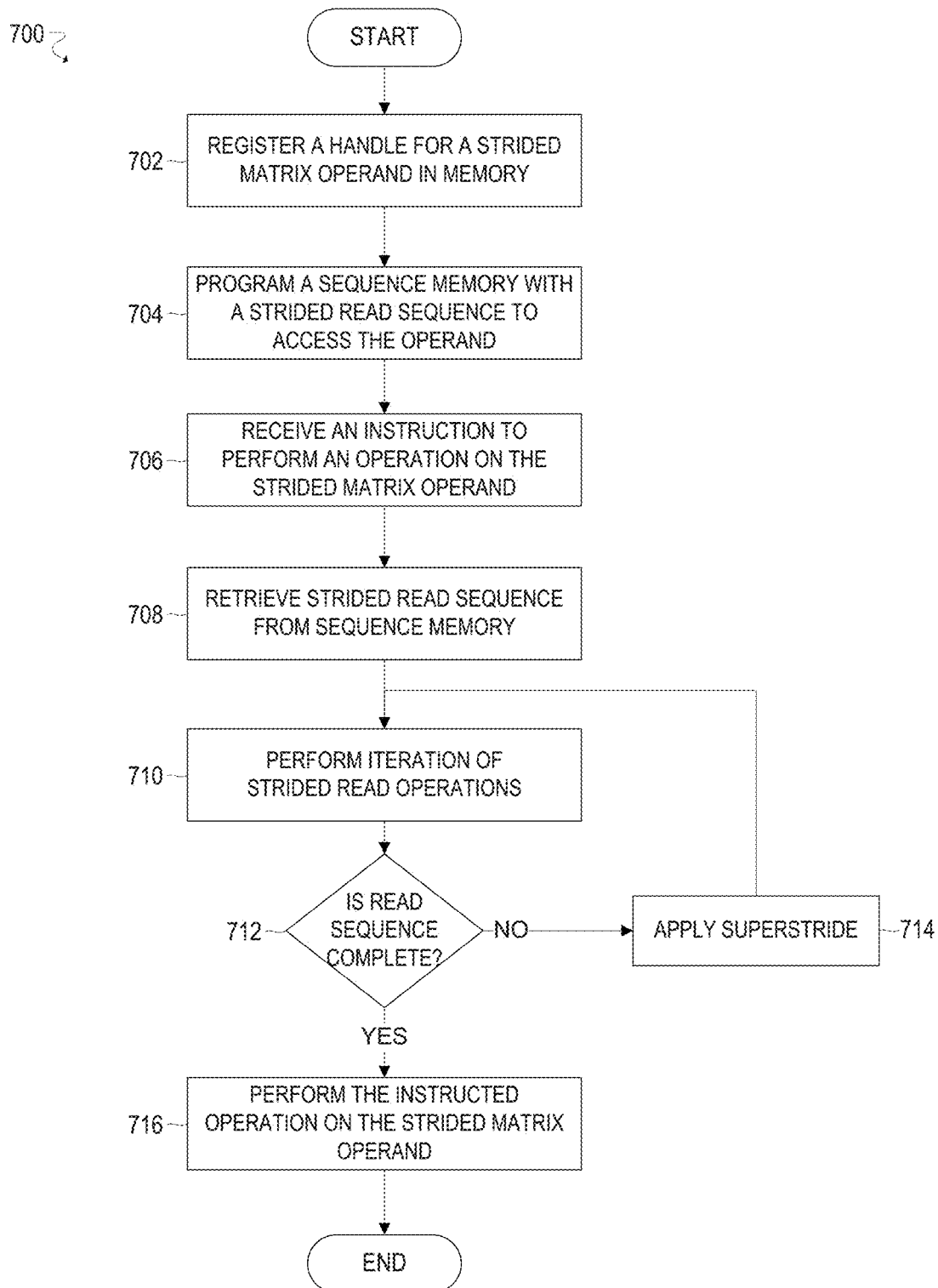
FIG. 7 illustrates a flowchart for an example embodiment of a multi-variate strided read operation.

FIG. 7 illustrates a flowchart 700 for an example embodiment of a multi-variate strided (MVS) read operation. In some embodiments, for example, flowchart 700 may be implemented using the matrix processing system 100 of FIG. 1.

The flowchart begins at block 702, where an instruction is received to register a handle for a multi-variate strided matrix operand stored in memory (e.g., a REGOP_MV instruction). For example, the REGOP_MV instruction may include various fields that can be used to extract the matrix operand from memory, such as a handle identifier (ID), base memory address, memory offset, dimensions, numeric element type (e.g., BFLOAT16 or SP32), operation size, sequence memory offset, loop size, and/or superstride, among other examples. Based on these fields, the specified handle ID is assigned to the matrix operand, which enables subsequent instructions to operate on the matrix operand by referencing its assigned handle ID.

The flowchart then proceeds to block 704, where a strided read sequence for accessing the matrix operand is programmed into sequence memory. In some embodiments, for example, one or more sequence memory write instructions (SEQMEM_WRITE) may be received to program the strided read sequence into sequence memory. The strided read sequence may include a sequence of strided read operations and/or banded read operations, which may be programmed into sequence memory at an offset specified by the 'sequence memory offset' field of the REGOP_MV instruction. Moreover, the total number of instructions in the strided read sequence may correspond to the 'loop size' field of the REGOP_MV instruction.

The flowchart then proceeds to block 706, where an instruction is received to perform an operation on the strided matrix operand, such as a matrix multiplication, convolution, or memory copy operation, among other examples. For example, the instruction may reference the handle ID of the matrix operand. Thus, in order to perform the particular operation required by the instruction, the matrix operand will be extracted from memory in the appropriate format or order using an MVS read operation (e.g., based on the fields specified in the REGOP_MV instruction and the corresponding strided read sequence in sequence memory).

For example, the MVS read operation reads a particular number of lines of memory (e.g., based on the 'operation size' field) that contain the elements of the matrix operand, which are read by looping through a strided read sequence of a particular size (based on the 'loop size' field), performing the strided and/or banded read operations in the strided read sequence, and applying a 'superstride' between each iteration of the strided read sequence (e.g., until the number of lines of memory required by the 'operation size' field have been read from memory).

Thus, the flowchart proceeds to block 708 to retrieve the strided read sequence for the matrix operand from sequence memory. For example, a particular number of entries are read from sequence memory at an offset indicated by the 'sequence memory offset' field of the REGOP_MV instruction. The number of entries read from sequence memory corresponds to the 'loop size' field of the REGOP_MV instruction, and each entry may contain an instruction to perform either a strided read operation or a banded read operation.

The flowchart then proceeds to block 710, where an iteration of read operations is performed. For example, in the first iteration, a first line of memory is read at a starting memory address corresponding to the 'base memory address'+'memory offset' fields of the REGOP_MV instruction. The strided read sequence (e.g., retrieved from sequence memory at block 708) is then performed to read one or more additional lines of memory relative to the starting memory address for the current iteration. For example, one or more strided read operations and/or banded read operations in the strided read sequence may be performed.

The flowchart then proceeds to block 712 to determine whether the MVS read operation is complete. For example, if the total number of lines of memory that have been read equals the value in the 'operation size' field of the REGOP_MV instruction, the MVS read operation is complete—otherwise, one or more additional iterations of the MVS read operation are required to read the remaining lines of memory.

For example, if it is determined at block 712 that the MVS read operation is not yet complete, the flowchart proceeds to block 714, where a superstride is applied to the starting memory address from the previous iteration in order to compute a new starting memory address for the next iteration.

The flowchart then proceeds back to block 710 to perform another iteration of read operations relative to the new starting memory address. For example, a line of memory is read at the new starting memory address, and then one or more additional lines of memory are read by repeating the strided read sequence relative to the new starting memory address.

The process repeats in this manner until the total number of lines of memory that have been read equals the value in the 'operation size' field of the REGOP_MV instruction.

Once it is determined at block 712 that the MVS read operation is complete, the flowchart then proceeds to block 716, where the appropriate operation is then performed on the matrix operand (e.g., the operation required by the instruction received at block 706).

At this point, the flowchart may be complete. In some embodiments, however, the flowchart may restart and/or certain blocks may be repeated. For example, in some embodiments, the flowchart may restart at block 702 to continue registering handles to access strided matrix operands.

Example Computing Architectures

The figures described throughout the following sections illustrate example implementations of computing systems, architectures, and/or environments that can be used in accordance with embodiments disclosed herein. Moreover, in some embodiments, certain hardware components and/or instructions described throughout this disclosure may be emulated or implemented as software modules (e.g., in the manner described below).

Exemplary Instruction Formats

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Embodiments of instruction(s) described herein may be embodied in different formats. In some embodiments, for example, instruction(s) may be embodied in a "generic vector friendly instruction format," as detailed further below. In other embodiments, such a format is not utilized and another instruction format is used, however, the description below of the writemask registers, various data transformations (swizzle, broadcast, etc.), addressing, etc. is generally applicable to any potential instruction format. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations through the vector friendly instruction format.

Figure 8A:
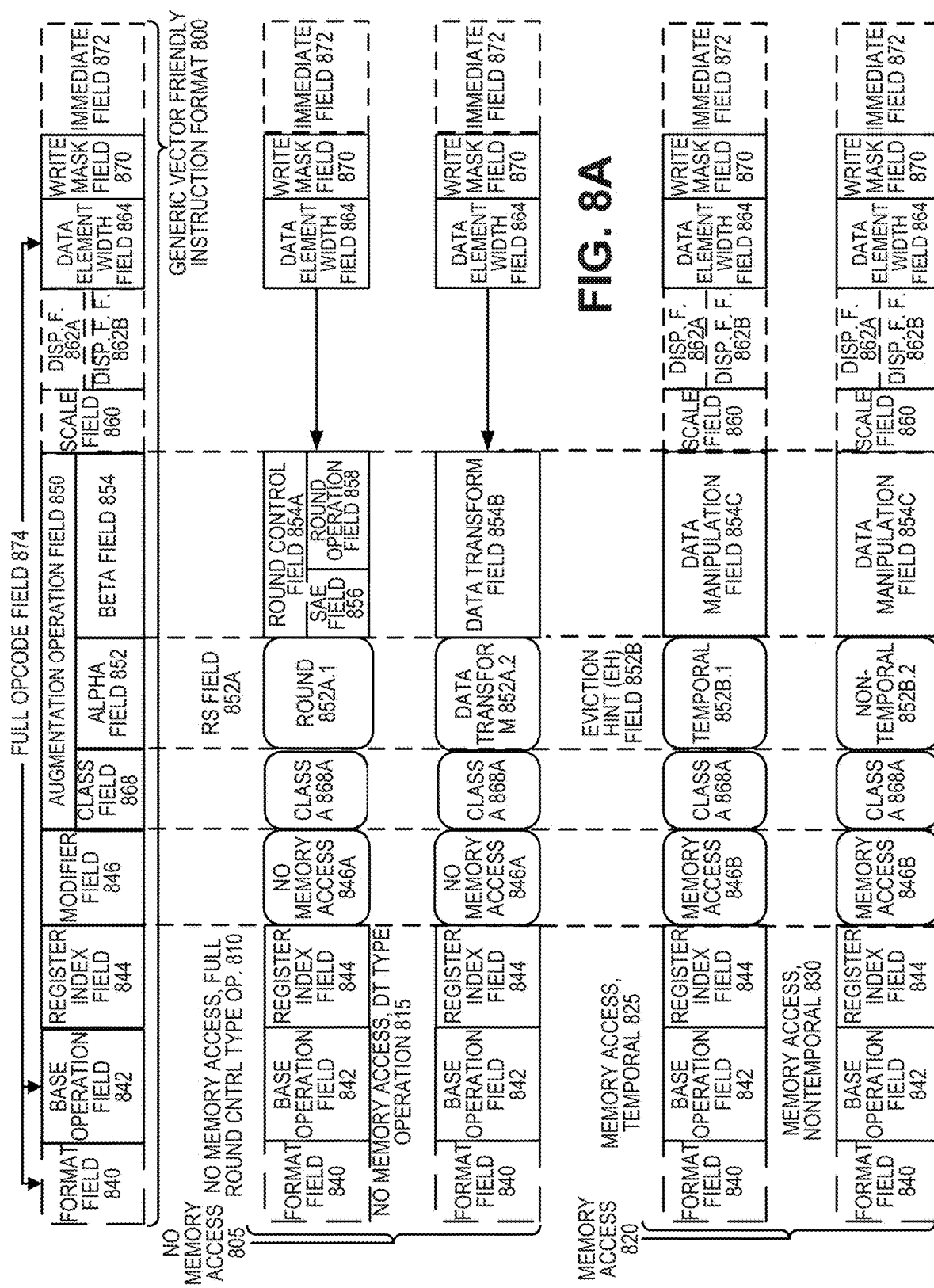
FIGS. 8A-B are block diagrams illustrating a generic vector friendly instruction format and instruction templates thereof according to embodiments of the disclosure.
Figure 8B:
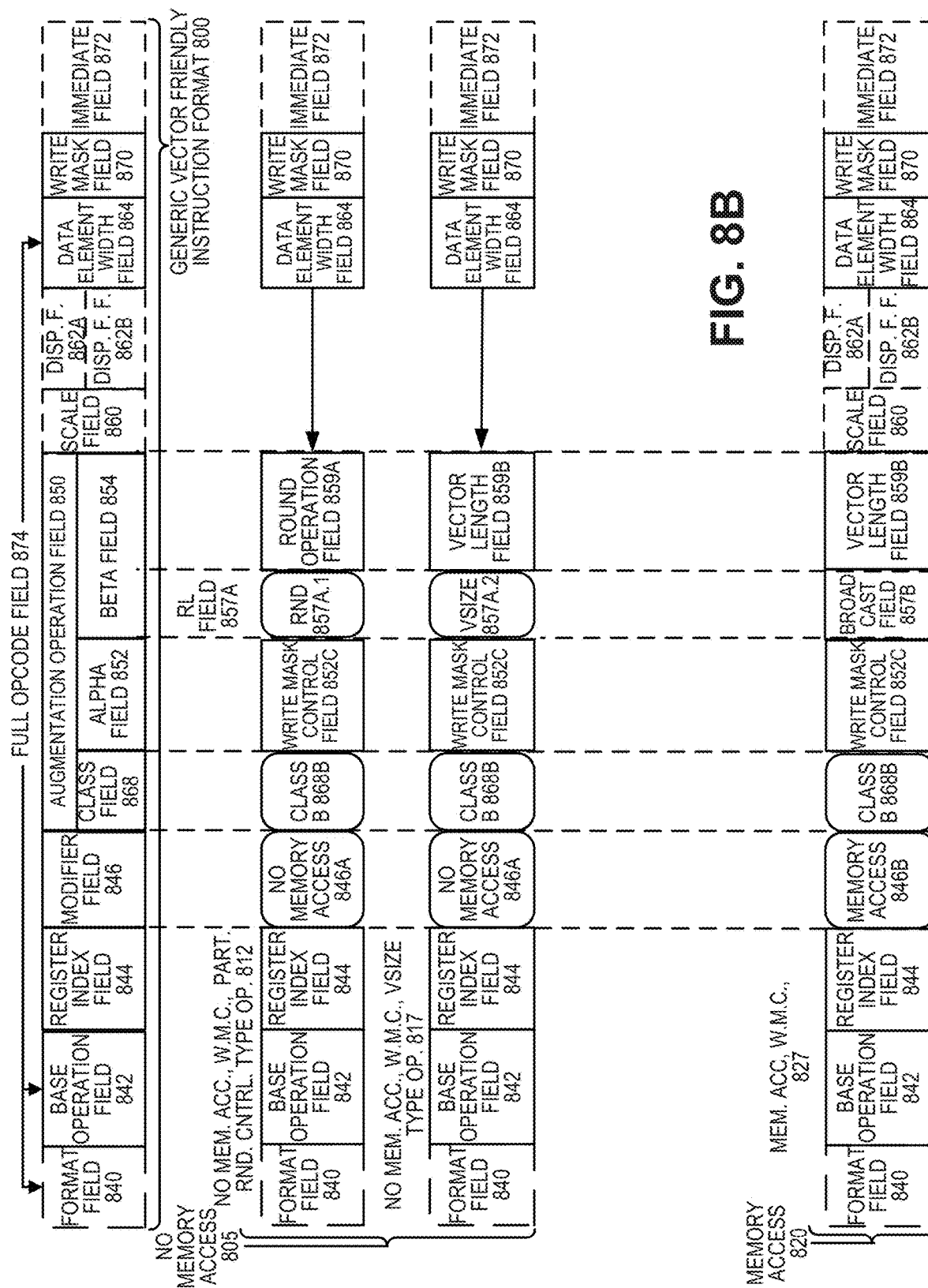

FIGS. 8A-B are block diagrams illustrating a generic vector friendly instruction format and instruction templates thereof according to embodiments of the disclosure. FIG. 8A is a block diagram illustrating a generic vector friendly instruction format and class A instruction templates thereof according to embodiments of the disclosure; while FIG. 8B is a block diagram illustrating the generic vector friendly instruction format and class B instruction templates thereof according to embodiments of the disclosure. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the disclosure, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses 2scale * index +base).

Displacement Field 862A—its content is used as part of memory address generation (e.g., for address generation that uses 2scale*index +base +displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses 2scale*index +base +scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the disclosure are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the disclosure the round control field 854A includes a suppress all floating point exceptions (SAE) field 856 and a round operation control field 858, alternative embodiments may support and/or encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the disclosure where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the disclosure where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the disclosure. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the disclosure are described with reference to the specific vector friendly instruction format 900 in the context of the generic vector friendly instruction format 800 for illustrative purposes, the disclosure is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the disclosure is not so limited (that is, the generic vector friendly instruction format 800 contemplates other sizes of the data element width field 864).

Figure 9A:
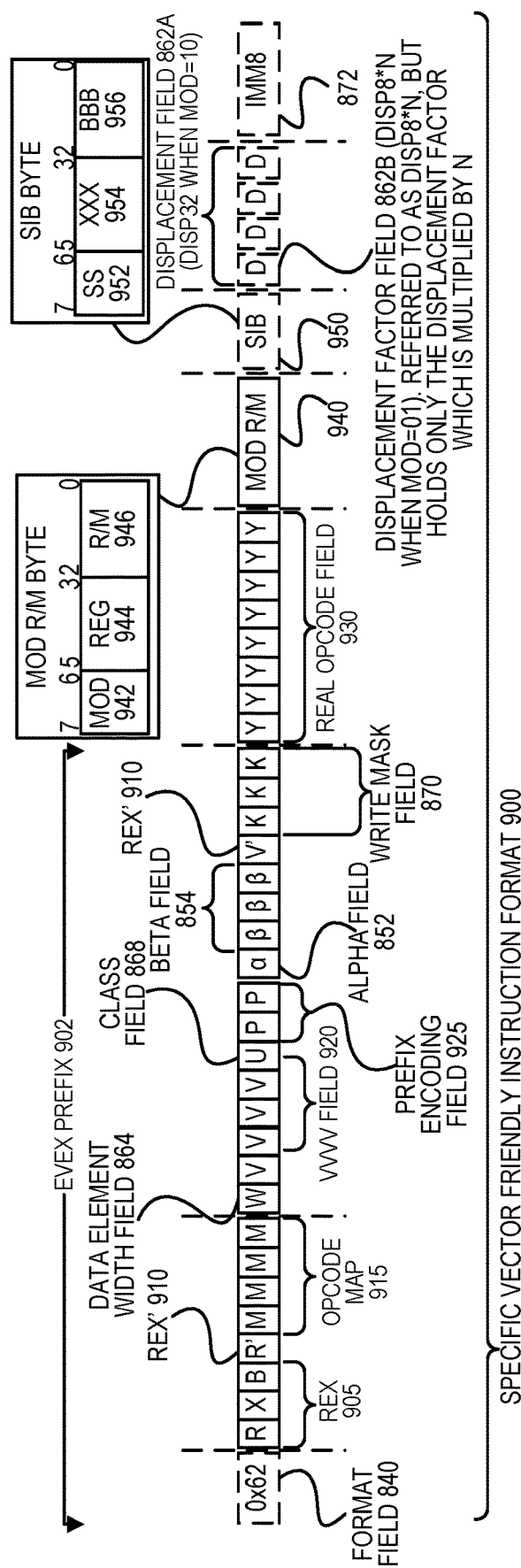
FIGS. 9A-D are block diagrams illustrating an exemplary specific vector friendly instruction format according to embodiments of the disclosure.

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0×62 (the unique value used for distinguishing the vector friendly instruction format in one embodiment of the disclosure).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]—U)—If EVEX.U=0, it indicates class A or EVEX.U0—; if EVEX.U=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [4]—SSS, also known as EVEX.s2-0, EVEX.r2-0, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 860, 952 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

Figure 9B:
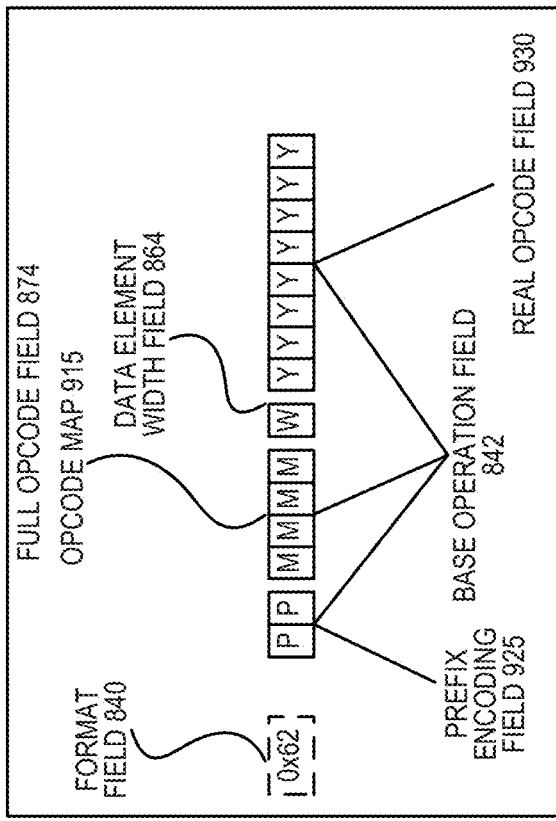

FIG. 9B is a block diagram illustrating the fields of the specific vector friendly instruction format 900 that make up the full opcode field 874 according to one embodiment of the disclosure. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

Figure 9C:
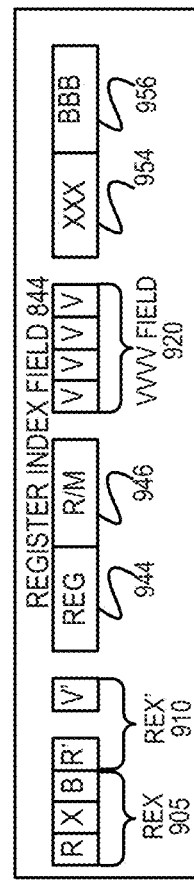

FIG. 9C is a block diagram illustrating the fields of the specific vector friendly instruction format 900 that make up the register index field 844 according to one embodiment of the disclosure. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
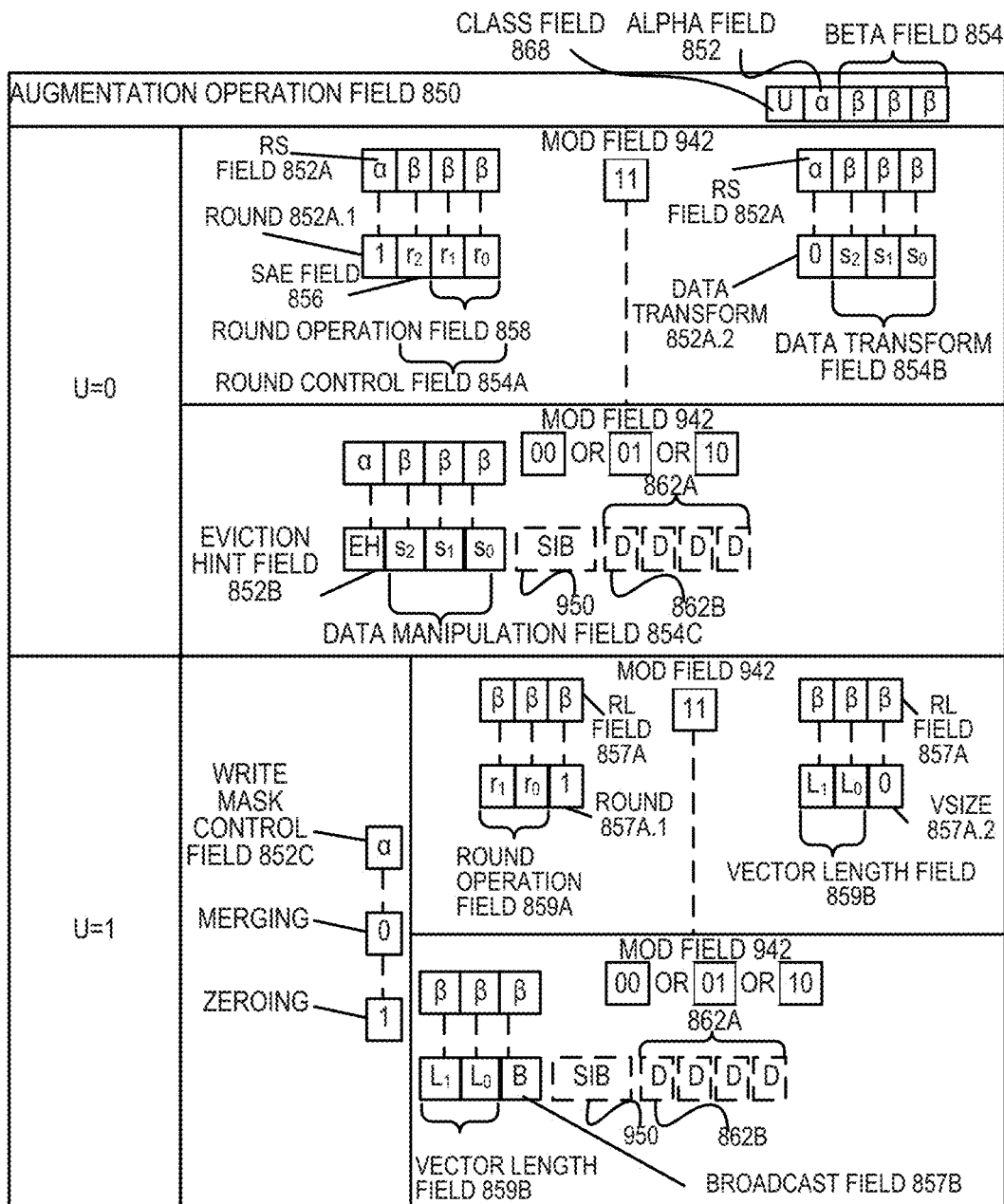

FIG. 9D is a block diagram illustrating the fields of the specific vector friendly instruction format 900 that make up the augmentation operation field 850 according to one embodiment of the disclosure. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—S0) is interpreted as the RL field 857A; when it contains a 1 (round 857A.1) the rest of the beta field 854 (EVEX byte 3, bit [6-5]—S2-1) is interpreted as the round operation field 859A, while when the RL field 857A contains a 0 (VSIZE 857.A2) the rest of the beta field 854 (EVEX byte 3, bit [6-5]—S2-1) is interpreted as the vector length field 859B (EVEX byte 3, bit [6-5]—L1-0). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—L1-0) and the broadcast field 857B (EVEX byte 3, bit [4]—B).

Exemplary Register Architecture

FIG. 10 is a block diagram of a register architecture 1000 according to one embodiment of the disclosure. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) B (FIG. 8B; U = 1) | 810, 815, 825, 830 812 | zmm registers (the vector length is 64 byte) zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In-Order and Out-of-Order Core Block Diagram

Figure 11A:
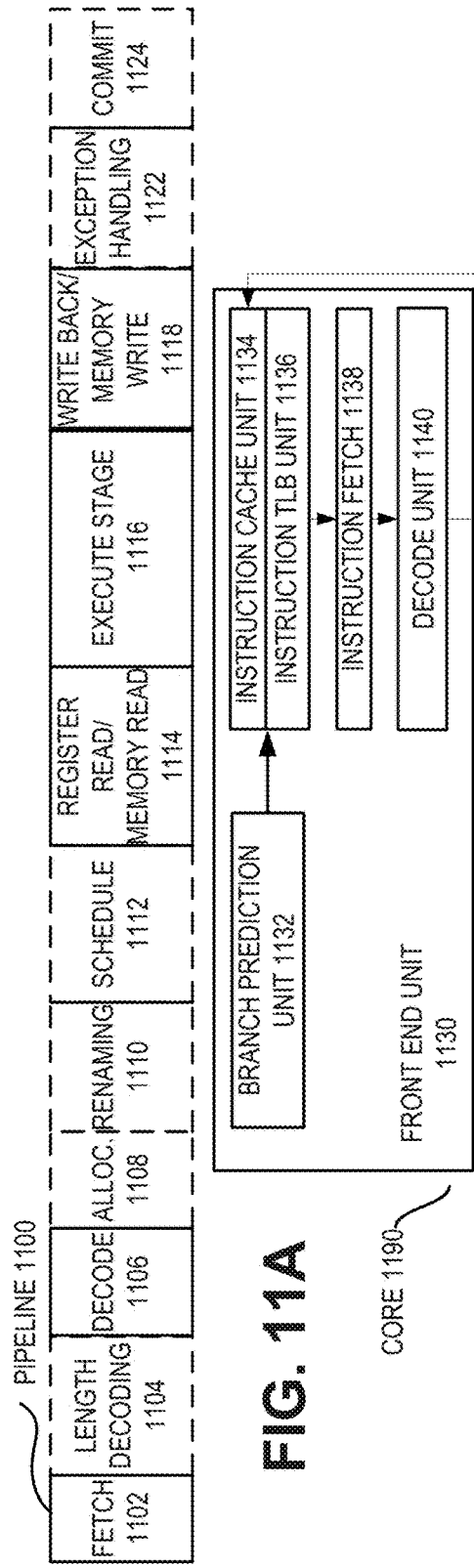
FIG. 11A is a block diagram illustrating both an exemplary in-order pipeline and an exemplary register renaming, out-of-order issue/execution pipeline according to embodiments of the disclosure.
Figure 11B:
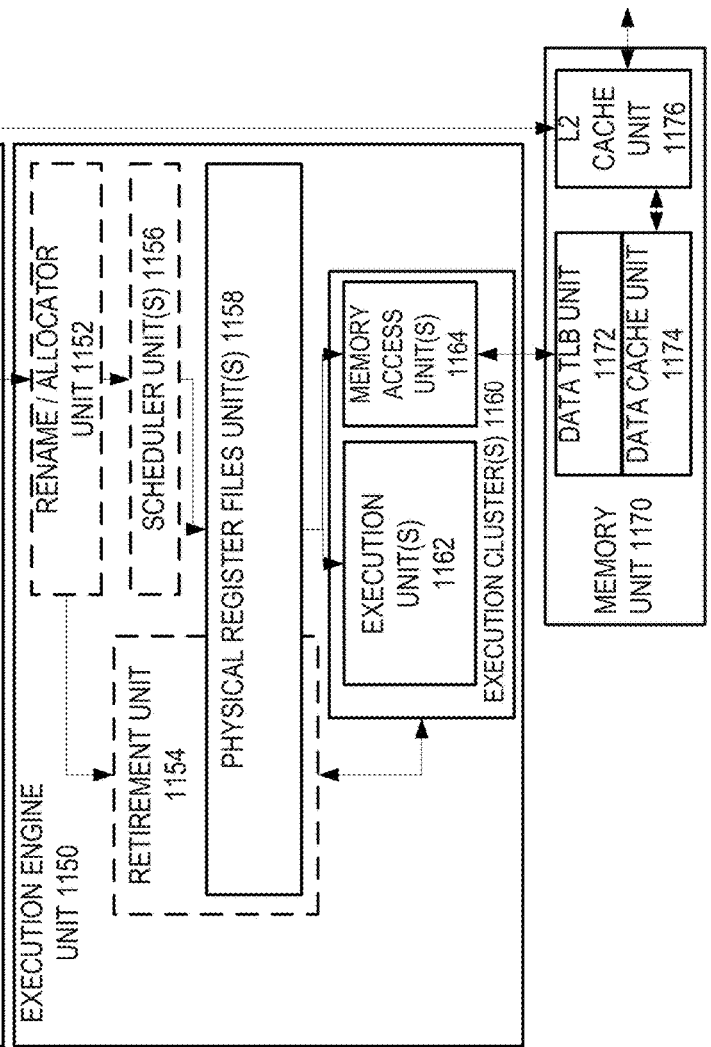
FIG. 11B is a block diagram illustrating both an exemplary embodiment of an in-order architecture core and an exemplary register renaming, out-of-order issue/execution architecture core to be included in a processor according to embodiments of the disclosure.

FIG. 11A is a block diagram illustrating both an exemplary in-order pipeline and an exemplary register renaming, out-of-order issue/execution pipeline according to embodiments of the disclosure. FIG. 11B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the disclosure. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the disclosure may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the disclosure. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
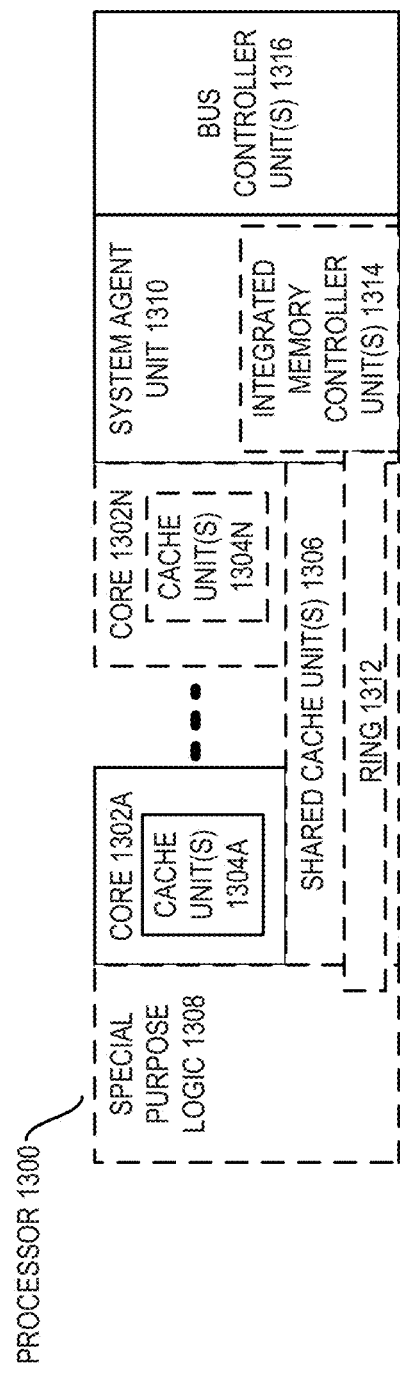
FIG. 13 is a block diagram of a processor that may have more than one core, may have an integrated memory controller, and may have integrated graphics according to embodiments of the disclosure.

FIG. 13 is a block diagram of a processor 1300 that may have more than one core, may have an integrated memory controller, and may have integrated graphics according to embodiments of the disclosure. The solid lined boxes in FIG. 13 illustrate a processor 1300 with a single core 1302A (and corresponding cache unit 1304A), a system agent 1310, a set of one or more bus controller units 1316, while the optional addition of the dashed lined boxes illustrates an alternative processor 1300 with multiple cores 1302A-N (and corresponding cache units 1304A-N), a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
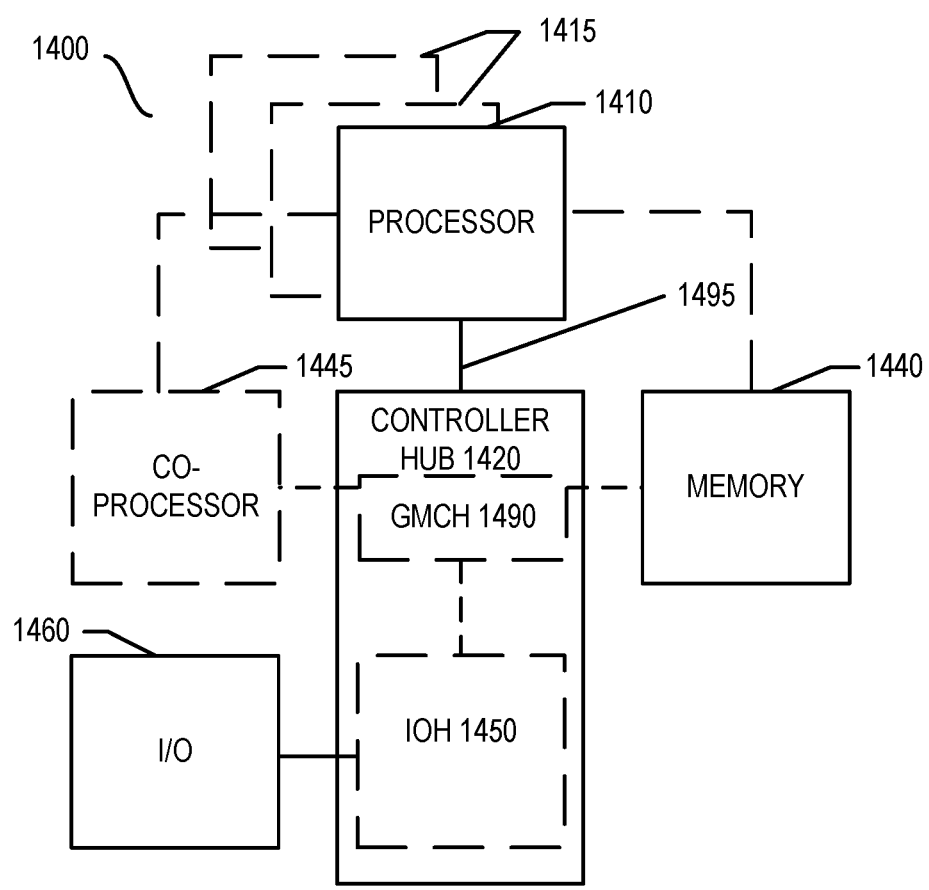
FIGS. 14, 15, 16, and 17 are block diagrams of exemplary computer architectures.

Referring now to FIG. 14, shown is a block diagram of a system 1400 in accordance with one embodiment of the present disclosure. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
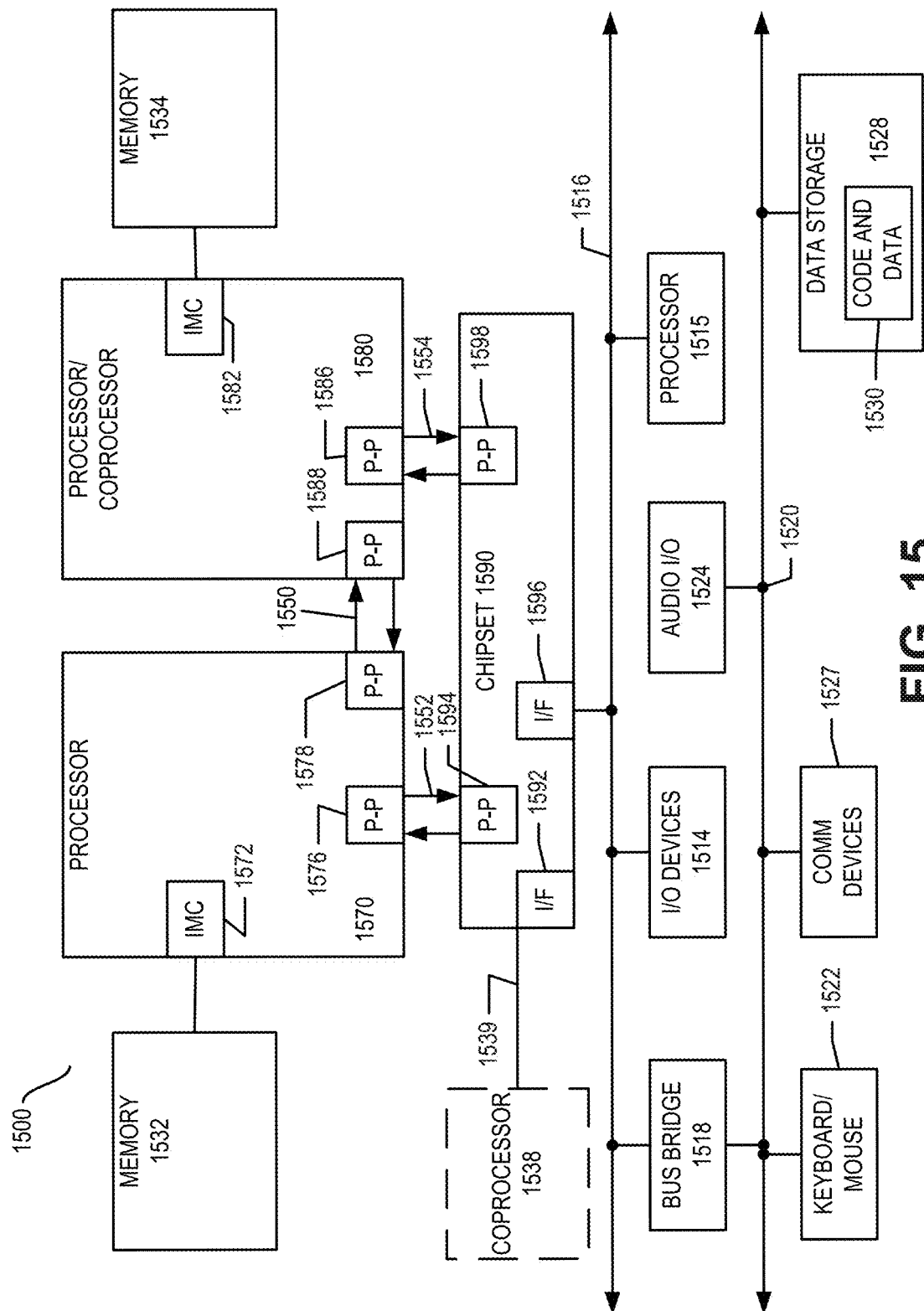

Referring now to FIG. 15, shown is a block diagram of a first more specific exemplary system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the disclosure, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592, 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
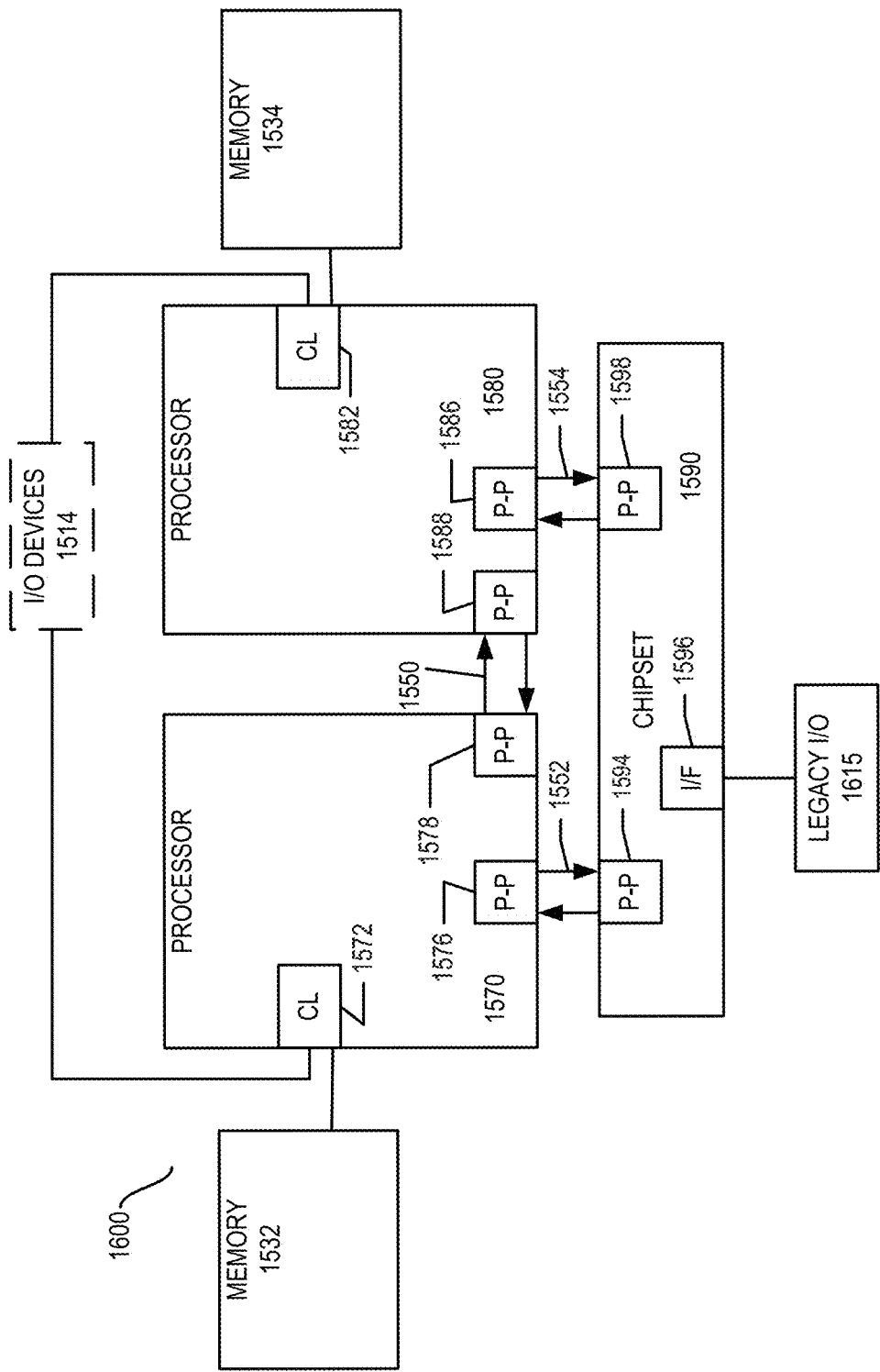

Referring now to FIG. 16, shown is a block diagram of a second more specific exemplary system 1600 in accordance with an embodiment of the present disclosure. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
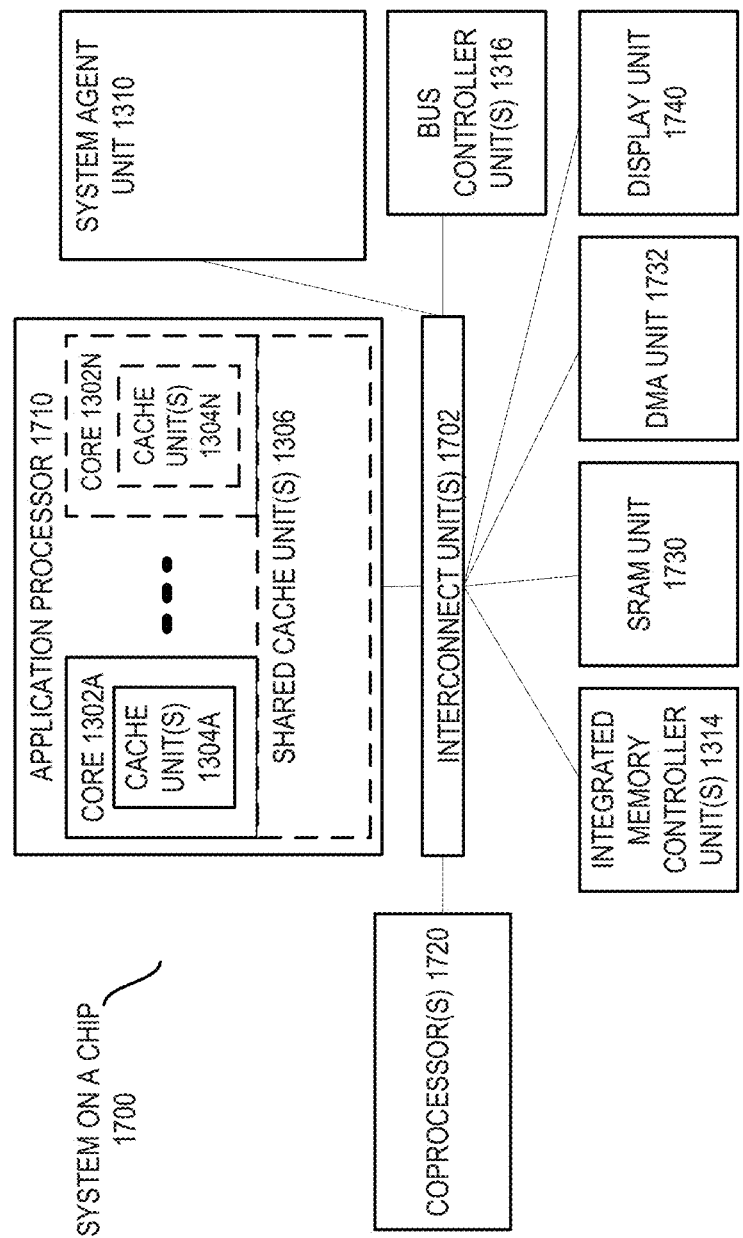

Referring now to FIG. 17, shown is a block diagram of a SoC 1700 in accordance with an embodiment of the present disclosure. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314;

a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
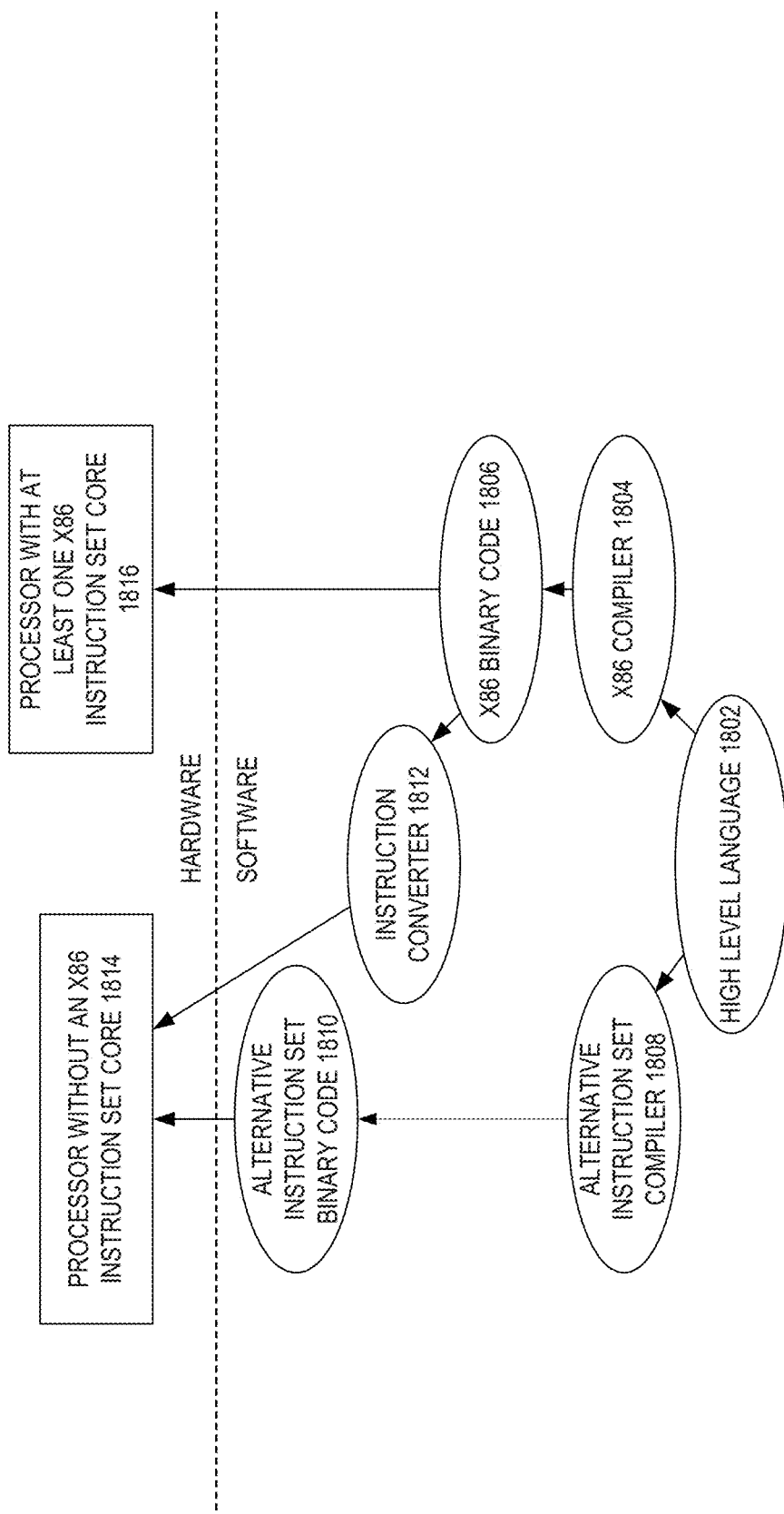
FIG. 18 is a block diagram contrasting the use of a software instruction converter to convert binary instructions in a source instruction set to binary instructions in a target instruction set according to embodiments of the disclosure.

FIG. 18 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include a matrix processor, comprising: a memory to store a matrix operand and a strided read sequence, wherein: the matrix operand is stored out of order in the memory; and the strided read sequence comprises a sequence of read operations to read the matrix operand in a correct order from the memory; control circuitry to receive a first instruction to be executed by the matrix processor, wherein the first instruction is to instruct the matrix processor to perform a first operation on the matrix operand; read circuitry to read the matrix operand from the memory based on the strided read sequence; and execution circuitry to execute the first instruction by performing the first operation on the matrix operand.

In one example embodiment of a matrix processor, the sequence of read operations comprises one or more of: a strided read operation to read the memory at a strided memory address, wherein the strided memory address is offset from a preceding memory address by a stride offset; or a banded read operation to read the memory at one or more sequential memory addresses following the preceding memory address.

In one example embodiment of a matrix processor, the read circuitry to read the matrix operand from the memory based on the strided read sequence is further to: read the matrix operand from the memory via a plurality of iterations of read operations, wherein: each iteration of read operations begins at a corresponding starting memory address of the memory; the strided read sequence is at least partially performed in each iteration of read operations; and the corresponding starting memory address is incremented by a superstride offset between the plurality of iterations of read operations.

In one example embodiment of a matrix processor, the read circuitry to read the matrix operand from the memory via the plurality of iterations of read operations is further to: continuously perform the plurality of iterations of read operations until a predetermined number of read operations has been performed.

In one example embodiment of a matrix processor: the control circuitry is further to receive a second instruction to be executed by the matrix processor, wherein: the second instruction is to be received before the first instruction; and the second instruction is to instruct the matrix processor to register an identifier for the matrix operand, wherein the identifier is to be registered based on one or more parameters indicating a memory footprint of the matrix operand in the memory, and wherein the identifier is to enable the matrix operand to be identified in subsequent instructions; and the first instruction comprises a first parameter indicating the identifier for the matrix operand.

In one example embodiment of a matrix processor, the control circuitry is further to receive a second instruction to be executed by the matrix processor, wherein the second instruction is to be received before the first instruction, and wherein the second instruction is to instruct the matrix processor to program the strided read sequence into the memory.

In one example embodiment of a matrix processor: the matrix operand comprises a plurality of dimensions arranged in a first order; the plurality of dimensions is arranged in the memory in a second order different from the first order; and the strided read sequence is programmed to perform a dimension shuffle operation to reorder the plurality of dimensions from the second order to the first order.

In one example embodiment of a matrix processor: the matrix operand is stored in the memory at a plurality of non-contiguous memory addresses; and the strided read sequence is programmed to perform a slicing operation to extract the matrix operand from the memory at the plurality of non-contiguous memory addresses.

In one example embodiment of a matrix processor, the memory comprises: a first memory to store the matrix operand; and a second memory to store the strided read sequence.

One or more embodiments may include at least one non-transitory machine accessible storage medium having instructions stored thereon, wherein the instructions, when executed on a machine, cause the machine to: receive a first instruction to be executed by a matrix processor, wherein the first instruction is to instruct the matrix processor to perform a first operation on a matrix operand, wherein the matrix operand is stored out of order in a memory of the matrix processor; access a strided read sequence stored in the memory, wherein the strided read sequence comprises a sequence of read operations to read the matrix operand in a correct order from the memory; read the matrix operand from the memory based on the strided read sequence; and cause the first instruction to be executed by the matrix processor, wherein the first instruction is to be executed by performing the first operation on the matrix operand.

In one example embodiment of a storage medium, the sequence of read operations comprises one or more of: a strided read operation to read the memory at a strided memory address, wherein the strided memory address is offset from a preceding memory address by a stride offset; or a banded read operation to read the memory at one or more sequential memory addresses following the preceding memory address.

In one example embodiment of a storage medium, the instructions that cause the machine to read the matrix operand from the memory based on the strided read sequence further cause the machine to: read the matrix operand from the memory via a plurality of iterations of read operations, wherein: each iteration of read operations begins at a corresponding starting memory address of the memory; the strided read sequence is at least partially performed in each iteration of read operations; and the corresponding starting memory address is incremented by a superstride offset between the plurality of iterations of read operations.

In one example embodiment of a storage medium, the instructions that cause the machine to read the matrix operand from the memory via the plurality of iterations of read operations further cause the machine to: continuously perform the plurality of iterations of read operations until a predetermined number of read operations has been performed.

In one example embodiment of a storage medium: the instructions further cause the machine to receive a second instruction to be executed by the matrix processor, wherein: the second instruction is to be received before the first instruction; and the second instruction is to instruct the matrix processor to register an identifier for the matrix operand, wherein the identifier is to be registered based on one or more parameters indicating a memory footprint of the matrix operand in the memory, and wherein the identifier is to enable the matrix operand to be identified in subsequent instructions; and the first instruction comprises a first parameter indicating the identifier for the matrix operand.

In one example embodiment of a storage medium, the instructions further cause the machine to receive a second instruction to be executed by the matrix processor, wherein the second instruction is to be received before the first instruction, and wherein the second instruction is to instruct the matrix processor to program the strided read sequence into the memory.

In one example embodiment of a storage medium: the matrix operand comprises a plurality of dimensions arranged in a first order; the plurality of dimensions is arranged in the memory in a second order different from the first order; and the strided read sequence is programmed to perform a dimension shuffle operation to reorder the plurality of dimensions from the second order to the first order.

In one example embodiment of a storage medium: the matrix operand is stored in the memory at a plurality of non-contiguous memory addresses; and the strided read sequence is programmed to perform a slicing operation to extract the matrix operand from the memory at the plurality of non-contiguous memory addresses.

In one example embodiment of a storage medium, the memory comprises: a first memory to store the matrix operand; and a second memory to store the strided read sequence.

One or more embodiments may include a method, comprising: receiving a first instruction to be executed by a matrix processor, wherein the first instruction is to instruct the matrix processor to perform a first operation on a matrix operand, wherein the matrix operand is stored out of order in a memory of the matrix processor; accessing a strided read sequence stored in the memory, wherein the strided read sequence comprises a sequence of read operations to read the matrix operand in a correct order from the memory; reading the matrix operand from the memory based on the strided read sequence; and causing the first instruction to be executed by the matrix processor, wherein the first instruction is to be executed by performing the first operation on the matrix operand.

In one example embodiment of a method, the sequence of read operations comprises one or more of: a strided read operation to read the memory at a strided memory address, wherein the strided memory address is offset from a preceding memory address by a stride offset; or a banded read operation to read the memory at one or more sequential memory addresses following the preceding memory address.

In one example embodiment of a method, reading the matrix operand from the memory based on the strided read sequence comprises: reading the matrix operand from the memory via a plurality of iterations of read operations, wherein: each iteration of read operations begins at a corresponding starting memory address of the memory; the strided read sequence is at least partially performed in each iteration of read operations; and the corresponding starting memory address is incremented by a superstride offset between the plurality of iterations of read operations.

In one example embodiment of a method, the method further comprises: receiving a second instruction to be executed by the matrix processor, wherein: the second instruction is to be received before the first instruction; and the second instruction is to instruct the matrix processor to register an identifier for the matrix operand, wherein the identifier is to be registered based on one or more parameters indicating a memory footprint of the matrix operand in the memory, and wherein the identifier is to enable the matrix operand to be identified in subsequent instructions; and wherein the first instruction comprises a first parameter indicating the identifier for the matrix operand.

One or more embodiments may include a system, comprising: a host processor; and a matrix processor, comprising: a memory to store a matrix operand and a strided read sequence, wherein: the matrix operand is stored out of order in the memory; and the strided read sequence comprises a sequence of read operations to read the matrix operand in a correct order from the memory; control circuitry to receive a first instruction to be executed by the matrix processor, wherein the first instruction is to instruct the matrix processor to perform a first operation on the matrix operand, and wherein the first instruction is to be received from the host processor; read circuitry to read the matrix operand from the memory based on the strided read sequence; and execution circuitry to execute the first instruction by performing the first operation on the matrix operand.

In one example embodiment of a system, the sequence of read operations comprises one or more of: a strided read operation to read the memory at a strided memory address, wherein the strided memory address is offset from a preceding memory address by a stride offset; or a banded read operation to read the memory at one or more sequential memory addresses following the preceding memory address.

In one example embodiment of a system, the read circuitry to read the matrix operand from the memory based on the strided read sequence is further to: read the matrix operand from the memory via a plurality of iterations of read operations, wherein: each iteration of read operations begins at a corresponding starting memory address of the memory; the strided read sequence is at least partially performed in each iteration of read operations; and the corresponding starting memory address is incremented by a superstride offset between the plurality of iterations of read operations.

What is claimed is:

1. A matrix processor, comprising:
a memory to store a matrix operand and a strided read sequence associated with the matrix operand, wherein:
the matrix operand is stored out of order in the memory; and
the strided read sequence indicates a sequence of read operations to read the matrix operand in a correct order from the memory;
control circuitry to receive a first instruction to be executed by the matrix processor, wherein the first instruction is to instruct the matrix processor to perform a first operation on the matrix operand, wherein the first instruction comprises an opcode and an operand identifier, wherein the opcode is to identify the first operation, and wherein the operand identifier is to identify a starting memory address of the matrix operand and the strided read sequence;
read circuitry to, based on receiving the first instruction:
read, from the memory, the strided read sequence identified by the operand identifier; and
read, from the memory, the matrix operand, wherein the matrix operand is read from the memory based on the starting memory address and the strided read sequence identified by the operand identifier; and
execution circuitry to execute the first instruction by performing the first operation on the matrix operand.

2. The matrix processor of claim 1, wherein the sequence of read operations comprises one or more of:
a strided read operation to read the memory at a strided memory address, wherein the strided memory address is offset from a preceding memory address by a stride offset; or a banded read operation to read the memory at one or more sequential memory addresses following the preceding memory address.

3. The matrix processor of claim 1, wherein the read circuitry to read, from the memory, the matrix operand is further to:
read the matrix operand from the memory via a plurality of iterations of read operations, wherein:
each iteration of read operations begins at a corresponding starting memory address of the memory;
the strided read sequence is at least partially performed in each iteration of read operations; and
the corresponding starting memory address is incremented by a superstride offset between the plurality of iterations of read operations.

4. The matrix processor of claim 3, wherein the read circuitry to read the matrix operand from the memory via the plurality of iterations of read operations is further to:
continuously perform the plurality of iterations of read operations until a predetermined number of read operations has been performed.

5. The matrix processor of claim 1, wherein:
the control circuitry is further to receive a second instruction to be executed by the matrix processor, wherein:
the second instruction is to be received before the first instruction; and
the second instruction is to instruct the matrix processor to register the operand identifier for the matrix operand, wherein the operand identifier is to be registered based on one or more parameters indicating a memory footprint of the matrix operand in the memory, and wherein the operand identifier is to enable the matrix operand to be identified in subsequent instructions.

6. The matrix processor of claim 1, wherein the control circuitry is further to receive a second instruction to be executed by the matrix processor, wherein the second instruction is to be received before the first instruction, and wherein the second instruction is to instruct the matrix processor to program the strided read sequence into the memory.

7. The matrix processor of claim 6, wherein:
the matrix operand comprises a plurality of dimensions arranged in a first order;
the plurality of dimensions is arranged in the memory in a second order different from the first order; and
the strided read sequence is programmed to perform a dimension shuffle operation to reorder the plurality of dimensions from the second order to the first order.

8. The matrix processor of claim 6, wherein:
the matrix operand is stored in the memory at a plurality of non-contiguous memory addresses; and
the strided read sequence is programmed to perform a slicing operation to extract the matrix operand from the memory at the plurality of non-contiguous memory addresses.

9. The matrix processor of claim 1, wherein the memory comprises:
a first memory to store the matrix operand; and
a second memory to store the strided read sequence.

10. At least one non-transitory machine accessible storage medium having instructions stored thereon, wherein the instructions, when executed on a machine, cause the machine to:
receive a first instruction to be executed by a matrix processor, wherein the first instruction is to instruct the matrix processor to perform a first operation on a matrix operand, wherein the first instruction comprises an opcode and an operand identifier, wherein the opcode is to identify the first operation, and wherein the operand identifier is to identify:
a starting memory address of the matrix operand, wherein the matrix operand is stored out of order in a memory of the matrix processor; and
a strided read sequence associated with the matrix operand, wherein the strided read sequence is stored in the memory, and wherein the strided read sequence indicates a sequence of read operations to read the matrix operand in a correct order from the memory;
access the strided read sequence stored in the memory;
read, from the memory, the matrix operand, wherein the matrix operand is read from the memory based on the starting memory address and the strided read sequence; and
cause the first instruction to be executed by the matrix processor, wherein the first instruction is to be executed by performing the first operation on the matrix operand.

11. The storage medium of claim 10, wherein the sequence of read operations comprises one or more of:
a strided read operation to read the memory at a strided memory address, wherein the strided memory address is offset from a preceding memory address by a stride offset; or
a banded read operation to read the memory at one or more sequential memory addresses following the preceding memory address.

12. The storage medium of claim 10, wherein the instructions that cause the machine to read, from the memory, the matrix operand further cause the machine to:
read the matrix operand from the memory via a plurality of iterations of read operations, wherein:
each iteration of read operations begins at a corresponding starting memory address of the memory;
the strided read sequence is at least partially performed in each iteration of read operations; and
the corresponding starting memory address is incremented by a superstride offset between the plurality of iterations of read operations.

13. The storage medium of claim 12, wherein the instructions that cause the machine to read the matrix operand from the memory via the plurality of iterations of read operations further cause the machine to:
continuously perform the plurality of iterations of read operations until a predetermined number of read operations has been performed.

14. The storage medium of claim 10, wherein:
the instructions further cause the machine to receive a second instruction to be executed by the matrix processor, wherein:
the second instruction is to be received before the first instruction; and
the second instruction is to instruct the matrix processor to register the operand identifier for the matrix operand, wherein the operand identifier is to be registered based on one or more parameters indicating a memory footprint of the matrix operand in the memory, and wherein the operand identifier is to enable the matrix operand to be identified in subsequent instructions.

15. The storage medium of claim 10, wherein the instructions further cause the machine to receive a second instruction to be executed by the matrix processor, wherein the second instruction is to be received before the first instruction, and wherein the second instruction is to instruct the matrix processor to program the strided read sequence into the memory.

16. The storage medium of claim 15, wherein:
the matrix operand comprises a plurality of dimensions arranged in a first order;
the plurality of dimensions is arranged in the memory in a second order different from the first order; and
the strided read sequence is programmed to perform a dimension shuffle operation to reorder the plurality of dimensions from the second order to the first order.

17. The storage medium of claim 15, wherein:
the matrix operand is stored in the memory at a plurality of non-contiguous memory addresses; and
the strided read sequence is programmed to perform a slicing operation to extract the matrix operand from the memory at the plurality of non-contiguous memory addresses.

18. The storage medium of claim 10, wherein the memory comprises:
a first memory to store the matrix operand; and
a second memory to store the strided read sequence.

19. A method, comprising:
receiving a first instruction to be executed by a matrix processor, wherein the first instruction is to instruct the matrix processor to perform a first operation on a matrix operand, wherein the first instruction comprises an opcode and an operand identifier, wherein the opcode is to identify the first operation, and wherein the operand identifier is to identify:
a starting memory address of the matrix operand, wherein the matrix operand is stored out of order in a memory of the matrix processor; and
a strided read sequence associated with the matrix operand, wherein the strided read sequence is stored in the memory, and wherein the strided read sequence indicates a sequence of read operations to read the matrix operand in a correct order from the memory;
accessing the strided read sequence stored in the memory;
reading, from the memory, the matrix operand, wherein the matrix operand is read from the memory based on the starting memory address and the strided read sequence; and
causing the first instruction to be executed by the matrix processor, wherein the first instruction is to be executed by performing the first operation on the matrix operand.

20. The method of claim 19, wherein the sequence of read operations comprises one or more of:
a strided read operation to read the memory at a strided memory address, wherein the strided memory address is offset from a preceding memory address by a stride offset; or
a banded read operation to read the memory at one or more sequential memory addresses following the preceding memory address.

21. The method of claim 19, wherein reading, from the memory, the matrix operand comprises:
reading the matrix operand from the memory via a plurality of iterations of read operations, wherein:
each iteration of read operations begins at a corresponding starting memory address of the memory;
the strided read sequence is at least partially performed in each iteration of read operations; and
the corresponding starting memory address is incremented by a superstride offset between the plurality of iterations of read operations.

22. The method of claim 19, further comprising:
receiving a second instruction to be executed by the matrix processor, wherein:
the second instruction is to be received before the first instruction; and
the second instruction is to instruct the matrix processor to register the operand identifier for the matrix operand, wherein the operand identifier is to be registered based on one or more parameters indicating a memory footprint of the matrix operand in the memory, and wherein the operand identifier is to enable the matrix operand to be identified in subsequent instructions.

23. A system, comprising:
a host processor;
a memory to store a matrix operand and a strided read sequence, wherein:
the matrix operand is stored out of order in the memory; and
the strided read sequence indicates a sequence of read operations to read the matrix operand in a correct order from the memory; and
a matrix processor, comprising:
control circuitry to receive, from the host processor, a first instruction to be executed by the matrix processor, wherein the first instruction is to instruct the matrix processor to perform a first operation on the matrix operand, wherein the first instruction comprises an opcode and an operand identifier, wherein the opcode is to identify the first operation, and wherein the operand identifier is to identify a starting memory address of the matrix operand and the strided read sequence;
read circuitry to, based on receiving the first instruction:
read, from the memory, the strided read sequence identified by the operand identifier; and
read, from the memory, the matrix operand, wherein the matrix operand is read from the memory based on the starting memory address and the strided read sequence identified by the operand identifier; and
execution circuitry to execute the first instruction by performing the first operation on the matrix operand.

24. The system of claim 23, wherein the sequence of read operations comprises one or more of:
a strided read operation to read the memory at a strided memory address, wherein the strided memory address is offset from a preceding memory address by a stride offset; or
a banded read operation to read the memory at one or more sequential memory addresses following the preceding memory address.

25. The system of claim 23, wherein the read circuitry to read, from the memory, the matrix operand identified by the operand identifier is further to:
read the matrix operand from the memory via a plurality of iterations of read operations, wherein:
each iteration of read operations begins at a corresponding starting memory address of the memory;
the strided read sequence is at least partially performed in each iteration of read operations; and
the corresponding starting memory address is incremented by a superstride offset between the plurality of iterations of read operations.

* * * * *